US006947527B2

United States Patent
Clark, Jr. et al.

(10) Patent No.: US 6,947,527 B2
(45) Date of Patent: Sep. 20, 2005

(54) METHOD AND APPARATUS THAT PROVIDES A REUSABLE VOICE PATH IN ADDITION TO RELEASE LINK FUNCTIONALITY FOR USE WITH A PLATFORM HAVING A VOICE ACTIVATED FRONT END

(75) Inventors: Bobby R. Clark, Jr., Dallas, TX (US);
G. Raymond Miller, Dallas, TX (US);
Darryll B. Whitfield, Garland, TX (US); Robert R. Williams, Allen, TX (US)

(73) Assignee: Preferred Voice, Inc., Dallas, TX (US)

( * ) Notice: Subject to any disclaimer, the term of this patent is extended or adjusted under 35 U.S.C. 154(b) by 129 days.

(21) Appl. No.: 10/142,163

(22) Filed: May 9, 2002

(65) Prior Publication Data

US 2003/0210769 A1 Nov. 13, 2003

(51) Int. Cl.[7] .................................................. H04M 1/64
(52) U.S. Cl. .............................. 379/88.03; 379/218.01; 455/414.4
(58) Field of Search ........................... 379/88.01, 88.03, 379/88.11, 218.01, 88.02, 88.04, 88.13, 88.17, 88.18, 88.19, 114.05, 221.08, 265.02; 455/414.1, 414.2, 414.4

(56) References Cited

U.S. PATENT DOCUMENTS

| 5,377,186 | A | | 12/1994 | Wegner et al. | |
|---|---|---|---|---|---|
| 5,751,792 | A | * | 5/1998 | Chau et al. | 379/88.17 |
| 6,044,144 | A | * | 3/2000 | Becker et al. | 379/265.02 |
| 6,366,658 | B1 | * | 4/2002 | Bjornberg et al. | 379/221.08 |
| 6,381,325 | B1 | * | 4/2002 | Hanson | 379/218.01 |
| 6,427,002 | B2 | * | 7/2002 | Campbell et al. | 379/88.01 |
| 6,512,818 | B1 | * | 1/2003 | Donovan et al. | 379/88.18 |
| 6,584,183 | B2 | * | 6/2003 | Manto | 379/114.05 |
| 6,628,761 | B1 | * | 9/2003 | Adamczyk et al. | 379/88.19 |
| 6,690,772 | B1 | * | 2/2004 | Naik et al. | 379/88.03 |

* cited by examiner

*Primary Examiner*—Fan Tsang
*Assistant Examiner*—Gerald Gauthier

(57) ABSTRACT

A system access module and method of enabling a communication session for use with a platform having a voice activated front-end and associated with a telecommunications central office switch. In one embodiment, the system access module includes a call coordinator, coupled to the platform and said telecommunications central office switch, configured to establish, and later release, a voice command link between the voice integrated platform and a remote device. The call coordinator is further configured to direct the telecommunications central office switch to establish a voice communication path associated with the remote device employing the platform. The system access module also includes a call manager, coupled to the call coordinator, configured to allow reuse of at least a portion of the voice communication path as directed by the remote device.

120 Claims, 10 Drawing Sheets

METHOD AND APPARATUS THAT PROVIDES A REUSABLE VOICE PATH IN ADDITION TO RELEASE LINK FUNCTIONALITY FOR USE WITH A PLATFORM HAVING A VOICE ACTIVATED FRONT END

TECHNICAL FIELD OF THE INVENTION

The present invention is directed, in general, to telecommunications systems and, more specifically, to a system access module providing multiple features including release link functionality and a reusable voice path, a method of operation thereof, and a telephony server system employing the method and the system access module.

BACKGROUND OF THE INVENTION

The telecommunications industry presently offers a wide variety of telephony services to customers via telecommunications networks, providing wired or wireless access. In a fundamental role, the telecommunications networks interconnect one calling station to one or more called stations. In implementing this interconnection, a calling station places a call via a communications channel (e.g., a data channel) through one or more central office switches. The data channel carries signaling information identifying the calling number, the called number, toll charge, etc. The central office switch routes the data in accordance with this information to the called station and establishes a voice channel. In the process, both a data channel and a voice channel are employed to make and hold the connection. Once the voice channel is established, there is usually no longer a necessity to maintain the data channel.

Presently, when a calling station has completed a call, the above process is repeated again. Placing another call, however, may create a hazard if the calling station is a cellular telephone being used in an automobile. Furthermore, the calling station may have difficulty in connecting again to a central office switch when making another call.

Additionally, in the past when the telecommunications networks had adequate bandwidth and the data and voice channels were of the same type, the channels remained connected during the course of a communications session. In addition to using bandwidth, maintaining the data channel connection during a communications session created an unnecessary usage fee from a telephone company. Furthermore, telecommunications demand has increased at a tremendous rate over the last decade with an increase in communication devices and services such as facsimiles, pagers, cellular phones, personal computers, Internet access, high speed modems, etc. Thus, the luxury of being able to maintain the connectivity of the data channels, which may also be voice capable, during a voice call has been superseded by a need to use those channels for other purposes as soon as the voice channel has been established for a particular communication session.

Releasing a channel, such as the data channel, during a communications session is commonly referred to as a release link or release link technology. The release link technology has been implemented in the past with analog and T1 carriers in connection with local private branch exchanges. Due to advances in speech recognition systems, speech recognition may now be used to support telephony services such as call placing, directory assistance, conference calling, voice fax and voice mail.

Release link technology, however, is a feature that is typically purchased from the switch manufacturer and added to the central office switch. The addition of the release link technology may be cost prohibitive depending on various factors including the switch manufacturer. In addition to the cost, implementing the release link technology to a central office switch may be a time consuming endeavor. Furthermore, there are some central office switches that do not have the capability of even accepting or using the release link technology. The added cost and time in addition to the type of switch, therefore, may prevent a customer from installing a telephony system, such as one including speech recognition technology, that incorporates release link technology.

Accordingly, what is needed in the art is an apparatus and method that implements a release link technology in a multitude of switches or environments and provides a reusable voice channel, particularly, in association with a telephony system employing speech recognition technology.

SUMMARY OF THE INVENTION

To address the above-discussed deficiencies of the prior art, the present invention provides a system access module for use with a voice integrated platform having a voice activated front-end and associated with a telecommunications central office switch. In one embodiment, the system access module includes a call coordinator coupled to a call manager. The call coordinator, coupled to the voice integrated platform and the telecommunications central office switch, is configured to establish and later release, a voice command link between the voice integrated platform and a remote device. In addition, the call coordinator is configured to direct the telecommunications central office switch to establish a voice communication path associated with the remote device employing the voice integrated platform. The call manager is configured to allow reuse of at least a portion of the voice communication path as directed by the remote device.

In another aspect, the present invention provides a method of enabling a communication session using a system access module associated with a voice integrated platform having a voice activated front-end and a telecommunications central office switch. In one embodiment, the method includes establishing a voice command link between the voice integrated platform and a remote device. The method also includes directing the telecommunications central office switch to establish a voice communication path associated with the remote device employing the voice integrated platform. The method still further includes releasing the voice command link, and maintaining at least a portion of the voice communication path to allow reuse as directed by the remote device.

The present invention also provides, in yet another aspect, a system access module for use with an intelligent peripheral having a voice activated front-end and associated with a telecommunications central office switch. In one embodiment, this system access module includes a call coordinator, coupled to the intelligent peripheral and the telecommunications central office switch, that is configured to establish and later release a voice command link between the intelligent peripheral and a remote device. Further, the call coordinator is configured to direct the telecommunications central office switch to establish a voice communication path associated with the remote device employing the intelligent peripheral. The system access module also includes a call manager, coupled to the call coordinator, that allows reuse of at least a portion of the voice communication path as directed by the remote device.

In still another aspect, the present invention provides a method of enabling a communication session by employing an intelligent peripheral having a voice activated front-end and a telecommunications central office switch. In one embodiment, the method includes establishing a voice command link between the intelligent peripheral and a remote device. The method also includes directing the telecommunications central office switch to establish a voice communication path associated with the remote device employing the intelligent peripheral. The method further includes releasing the voice command link, and maintaining at least a portion of the voice communication path to allow reuse as directed by the remote device.

Still, in yet an additional aspect, the present invention provides a telephony server system associated with a telecommunications central office switch. In one embodiment, the telephony server system includes a voice integrated platform that has a voice activated front end and a system access module. The system access module includes a call coordinator coupled to a call manager. The call coordinator, which is coupled to the voice integrated platform and the telecommunications central office switch, establishes and later releases a voice command link between the voice integrated platform and a remote device. The call coordinator directs the telecommunications central office switch to establish a voice communication path associated with the remote device employing the voice integrated platform. The call manager, coupled to the call coordinator, allows reuse of at least a portion of the voice communication path as directed by the remote device.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
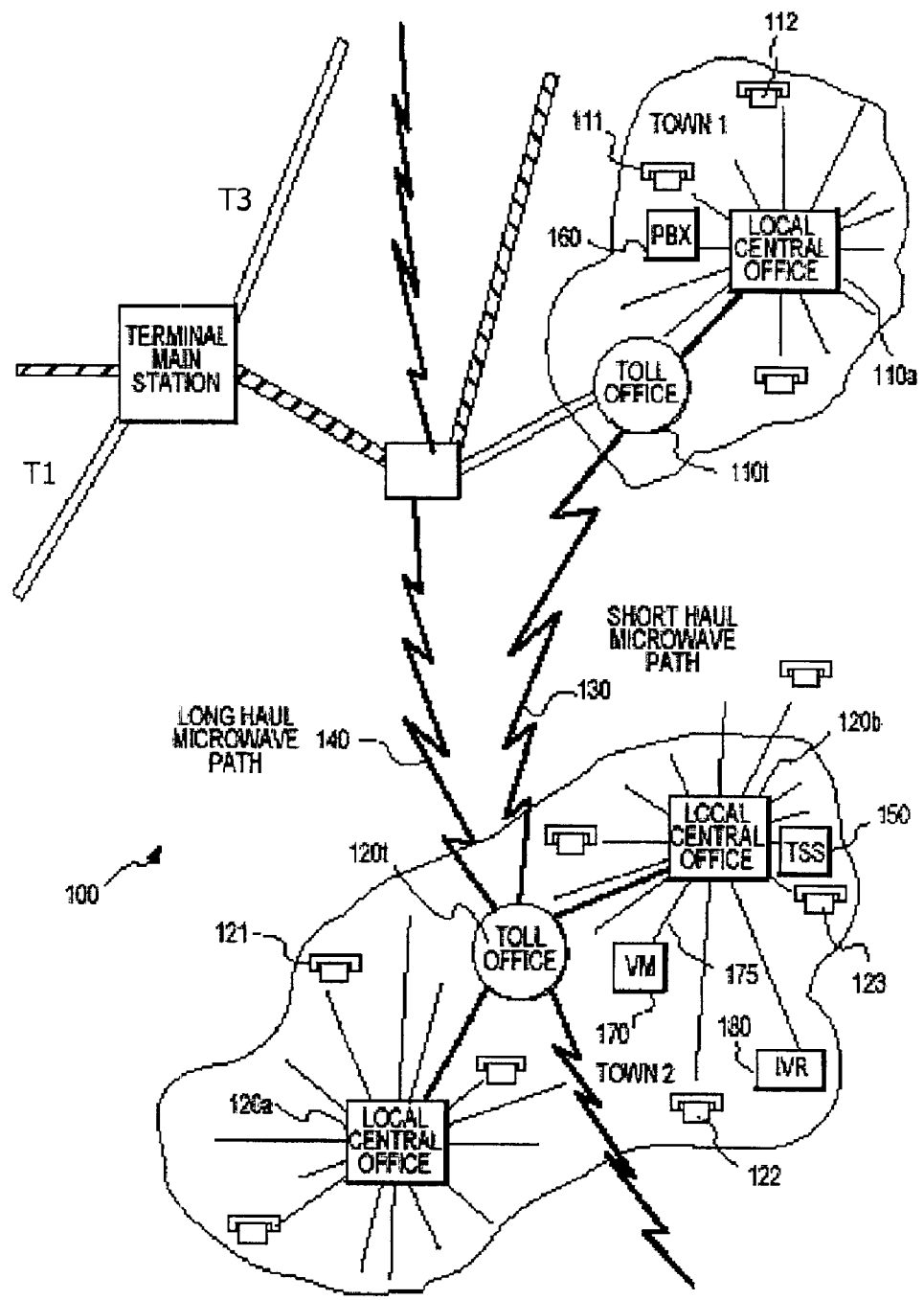
FIG. 1 illustrates a system level diagram of an embodiment of a telecommunications network providing an environment for application of the principles of the present invention.

Referring initially to FIG. 1, illustrated is a system level diagram of an embodiment of a telecommunications network 100 providing an environment for application of the principles of the present invention. The telecommunications network 100 serves communications between a plurality of locations (Town 1 and Town 2), which may be separated by a few miles or by hundreds of miles. Town 1 is served by a telecommunications central office switch 110a for local communications and a toll office 110t for toll communications. Due to the volume of telecommunications, Town 2 is served by two telecommunications central office switches 120a, 120b for local communications and a single toll office 120t for toll communications. Communications between customers (two of which are designated 111, 112) in Town 1 and customers (three of which are designated 121, 122, 123) in Town 2 may be routed over a short-haul microwave path 130.

The customers 111, 112, 121, 122, 123 may also be referred to as remote devices. The communications between the customers 121, 122, 123 in Town 2 and other locations may also be routed over a long-haul microwave path 140. Of course, other carriers (e.g., a DS1, a DS3, etc.) may also be employed as the application dictates. For the purposes of presentation, a telephony server system (TSS) 150 is illustrated as coupled to the telecommunications central office switch 120b associated with Town 2. Of course, additional telephony server systems may also be employed and coupled to the telecommunications central office switch 110a associated with Town 1 and the telecommunications central office switch 120a associated with Town 2.

The telecommunications network 100 further includes a private branch exchange (PBX) 160 (coupled to the telecommunications central office switch 110a) and telephony applications (associated with Town 2). In one advantageous embodiment, the telephony applications include a voice mail (VM) system 170 and an interactive voice response (IVR) system 180, which are coupled via dedicated lines (generally designated 175) to the telecommunications central office switch 120b. Additionally, it should be noted that other telephony applications may be included.

Figure 2:
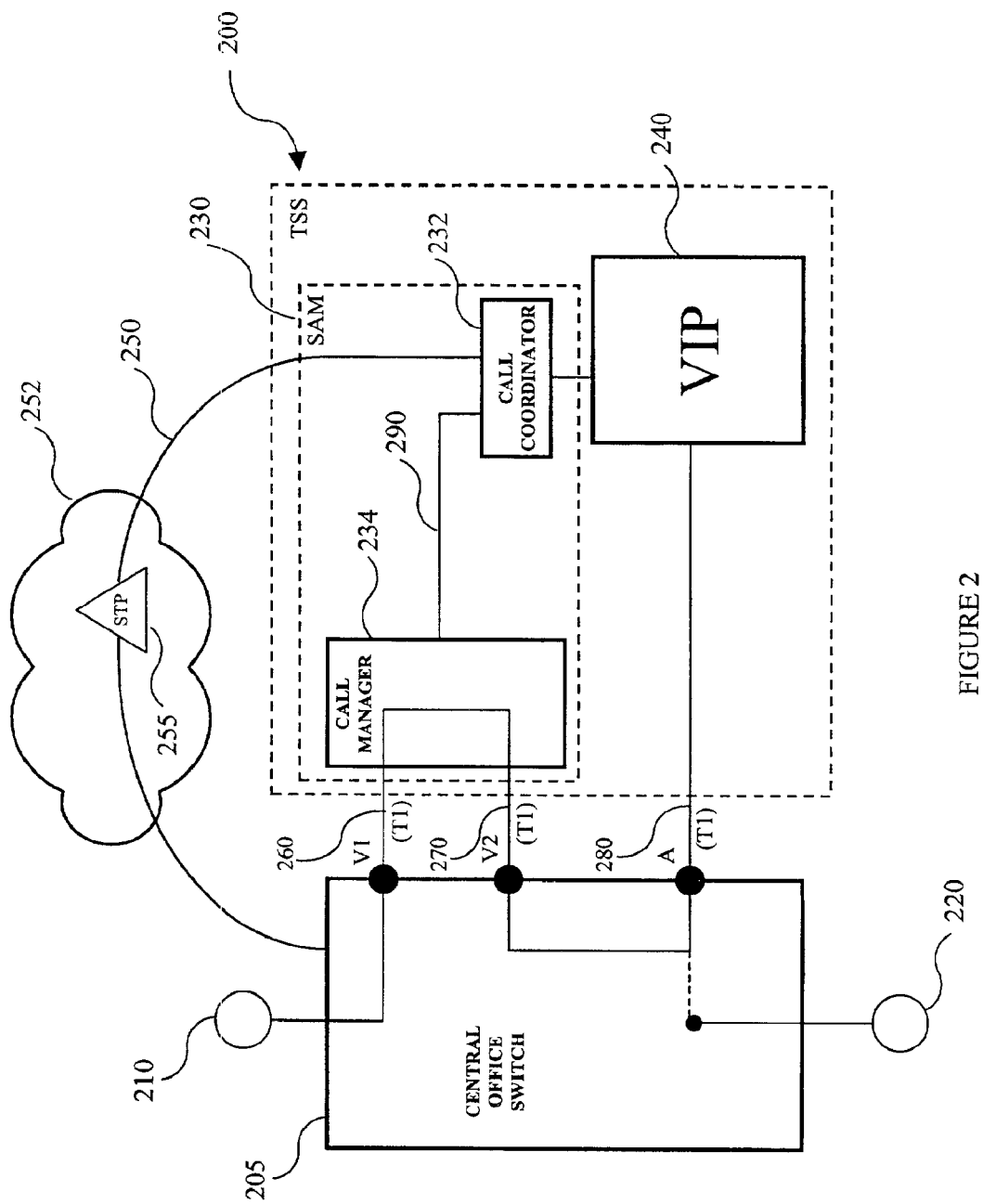
FIG. 2 illustrates a block diagram of an embodiment of a telephony server system in an environment of a telecommunications network constructed according to the principles of the present invention.

Referring now to FIG. 2, illustrated is a block diagram of an embodiment of a telephony server system 200 in an environment of a telecommunications network constructed according to the principles of the present invention. The telephony server system 200 is coupled to a telecommunications central office switch 205 that is, in turn, coupled to a first remote device 210 and a second remote device 220. The telephony server system 200 includes a system access module 230 and a voice integrated platform 240. The telephony server system 200 is coupled to the telecommunications central office switch 205 using a Signaling System Seven (SS7) link 250 employing a network 252 which includes a Signaling Transfer Point (STP) 255.

The system access module 230 includes a call coordinator 232 and a call manager 234. The call coordinator 232 is coupled to the call manager 234 through a control link 290. The call manager 234 is coupled to the telecommunications central office switch 205 through a first trunk member 260 at a port V1 and a second trunk member 270 at a port V2. The voice integrated platform 240 is coupled to the telecommunications central office switch 205 through a voice command link 280 at a port A.

The call coordinator 232 may establish and later release the voice command link 280 between the voice integrated platform 240 and the first remote device 210 to provide a voice communication path associated with the first remote device 210 and the telecommunications central office switch 205. In the illustrated embodiment, the voice communication path begins at the first remote device 210 and proceeds through the telecommunications central office switch 205, the first trunk member 260, the call manager 234, the second trunk member 270, back through the telecommunications central office switch 205 to the second remote device 220. The call coordinator 232 may intercept a call designated for the voice integrated platform 240 from the first remote device 210 by employing the first trunk member 260. Additionally, the call coordinator 232 may direct the voice integrated platform 240 and employ the voice command link 280 to obtain call parameters associated with the second remote device 220. The call parameters may include, among other things, a telephone number for the second remote device 220. The call coordinator 232 may assume control of switching a call which may be ordinarily provided by the telecommunications central office switch 205. In the illustrated embodiment, the call coordinator 232 is coupled to the telecommunications central office switch 205 using the SS7 link 250. The call coordinator 232 may also be coupled to the voice integrated platform 240 through an SS7 link. In other embodiments, the call coordinator 232 may be coupled to the voice integrated platform 240 via an ISDN PRI connection, a fiber optics connection or another connection which may transmit and receive controls signals.

The call manager 234, which is coupled to the call coordinator 232 by the control link 290, allows reuse of at least a portion of the voice communication path as directed by the first remote device 210. Typically, the portion of the voice communication path that may be reused traverses through the call manager 234. For example, the reusable portion of the voice communication path may include the first trunk member 260 and the second trunk member 270. By allowing a portion of the voice communication path to be re-used, the first remote device 210 may contact the voice integrated platform 240 multiple times without initiating another call.

In the illustrated embodiment, the telecommunications central office switch 205 may be a conventional telecommunications central office switch for wireless communications with the capability of a single trunk member being used for a local call or a long distance call. For example, the telecommunications central office switch 205 may be a DMS-MTX model switch manufactured by Nortel Networks Corporation of Brampton, Ontario, Canada. The telecommunications central office switch 205 may be provided with Release Link Technology (RLT) as an option. In other embodiments, the telecommunications central office switch 205 may be a conventional telecommunications central office switch for processing land line calls. Essentially, the telecommunications central office switch 205 may be a conventional telecommunications central office switch manufactured by a variety of manufacturers.

The first remote device 210 and the second remote device 220 may be conventional cellular telephones. In other embodiments, the first remote device 210 or the second remote device 220 may be other remote devices capable of voice communications over the telecommunications network such as a Personal Digital Assistant (PDA), a handheld computer, a laptop computer, a desktop computer or a conventional land line telephone.

The call coordinator 232 may be a dedicated system that is constructed of special-purpose hardware employing a sequence of operating instructions, which directs its operation. In other embodiments, the call coordinator 232 may be employed in a system that is solely hardwired or that is solely software enabled using general purpose hardware. For example, the call coordinator 232 may be employed on the voice integrated platform 240. The call coordinator 232 may include a signaling layer coupled to an application layer specific to the system access module 230. In the illustrated embodiment, the signaling layer is compatible with the SS7 protocol. In other embodiments, the signaling layer may be compatible with other signaling protocols which may be used.

The call manager 234 may also be a dedicated system that is constructed of special-purpose hardware employing a sequence of operating instructions, which directs its operation. In other embodiments, the call manager 234 may be employed in a system that is solely hardwired or that is solely software enabled using general purpose hardware. For example, the call manager 234 may be employed in a computer.

The voice integrated platform 240 may be embodied in special-purpose hardware employing a sequence of operating instructions, which directs its operation. The voice integrated platform 240 may be a voice integrated platform as discussed in U.S. patent application Ser. No. 09/718,934 filed on Nov. 21, 2000 and entitled "Voice Integrated Platform and Method of Operation Thereof," and incorporated herein by reference. The voice integrated platform 240 includes a voice activated front end and may provide Voice Activated Dialing (VAD). In other embodiments, the voice integrated platform 240 may provide other services. For example, the voice integrated platform 240 may be associated with speech recognition software to provide services such as Voice Activated Directory Assistance (VA411), text-to-speech email, messaging delivery and content delivery. In the illustrated embodiment, the voice integrated platform 240 is located proximate the telecommunications central office switch 205. In other embodiments, the voice integrated platform 240 may be located remotely from the telecommunications central office switch 205.

The SS7 link 250 is a standard SS7 A-link that is presently used in a majority of telecommunications networks. Similarly, the STP 255 may be a standard STP. The network 252 may include more than one STP 255 in mated pairs to provide redundancy. One skilled in the art will understand that the SS 7 link 250 may be a conventional SS7 F-link instead of an A-link.

The first trunk member 260, the second trunk member 270 and the voice command link 280 may be standard trunk members of conventional trunk lines associated with the telecommunications central office switch 205. The first trunk member 260, the second trunk member 270 and the voice command link 280 are each capable of providing a voice path. One skilled in the art will understand that the first trunk member 260, the second trunk member 270 and the voice command link 280 may simply represent a single trunk member of multiple trunk lines or a trunk group.

The control link 290 may be a conventional Internet Protocol (IP) link between the call coordinator 232 and the call manager 234. The control link 290 may provide communications between the call coordinator 232 and the call manager 234 through a SS7 link. In other embodiments, the control link 290 may be a dial-up Plain Old Telephone Service (POTS) or a fiber optic cable. In some embodiments, the control link 290 may be optional.

In one embodiment, for example a land line telecommunications central office switch, a calling party may call another party, a called party, using the telephony server system 200. The calling party may use the first remote device 210 to initiate a call to the voice integrated platform 240. The calling party may initiate the call by depressing a designated key or sequence of keys for the voice integrated platform 240. For instance, the calling party may depress *80 on the first remote device 210 which may be programmed to initiate a call to the voice integrated platform 240. After initiation, the first remote device 210 may send an Initial Address Message (IAM) on the first trunk member 260 to the telecommunications central office switch 205. The telecommunications central office switch 205 may send the IAM on the first trunk member 260 to the call coordinator 232 of the system access module 230 via the SS7 link 250. The call coordinator 232 may respond to the telecommunications central office switch 205 via the SS7 link 250 with an Address Complete (ACM) on the first trunk member 260 and an IAM on the second trunk member 270. The telecommunications central office switch 205 may then send an ACM on the second trunk member 270 and an IAM on the voice command link 280. The call coordinator 232 then sends an ACM for the voice command link 280 which establishes a complete voice path from the first remote device 210 to the voice integrated platform 240.

Once the voice path is completed from the first remote device 210 to the voice integrated platform 240, the voice integrated platform 240 may respond to the first remote device 210 with a message such as "Welcome to Voice Dialing." The calling party may then indicate the called party by stating "Call Bob." The voice integrated platform 240 receives the "Call Bob" statement from the first remote device 210 and may obtain "Bob's" telephone number through a directory of the calling party which is stored on the voice integrated platform 240.

The voice integrated platform 240 may then send a Release (REL) on the second trunk member 270. In response, the telecommunications central office switch 205 may respond with a Release Complete (RLC) on second trunk member 270. Additionally, the telecommunications central office switch 205 will send a REL on the voice command link 280 which may prompt a RLC on the voice command link 280 that releases the voice command link 280 and tears down the voice path from the first remote device 210 to the voice integrated platform 240. At this point, the call coordinator 232 may send an IAM on second trunk member 270 including the calling party and the called party. The telecommunications central office switch 205 may respond with an ACM on the second trunk member 270 thus establishing a voice communication path between the first remote device 210 and the second remote device 220.

The call between the first remote device 210 and the second remote device 220 is now established over the voice communication path which includes the first trunk member 260, the second trunk member 270 and a path through the call manager 234. The signaling messages used to coordinate the call may depend on several factors including the first remote device 210. For instance, if the first remote device 210 is a cellular phone, then the signaling may be through another method employing code division multiple access, which is a spread spectrum technology.

The path through the call manager 234 may allow the first trunk member 260 to be reused. For example, the call manager 234 may allow the first trunk member 260 to be pulled back. The called party may hang up the second remote device 220 which initiates a REL on the second trunk member 270 from the telecommunications central office switch 205 to the call coordinator 232. The call coordinator 232 may then send a RLC on the second trunk member 270 and issue an IAM on the second trunk member 270 to the telecommunications central office switch 205. As discussed above, a voice path between the first remote device 210 and the voice integrated platform 240 may then be established again.

The call manager 234 may also allow the reuse of the first trunk member 260 through an enhanced pull back. For instance, the first remote device 210 may initiate another call to the voice integrated platform 240 by depressing the # key for a predetermined period of time. Of course, the calling party may initiate another call using another key or combination of keys, a voice command or dual tone multi-frequency dialing. The call manager 234 may detect the long # and send a signal over the control link 290 to the call coordinator 232. The call coordinator 232 may then send a REL on the second trunk member 270 and the telecommunications central office switch 205 may respond with a RLC on the second trunk member 270 to the call coordinator 232. The call coordinator 232 may then issue an IAM on voice command link 280 to the telecommunications central office switch 205. Once again, this will allow a voice path to be established between the first remote device 210 and the voice integrated platform 240.

Additionally, an enhanced pull back may be initiated by the system access module 230 or the voice integrated platform 240. The enhanced pull back may be initiated by an automated or a coded response from the system access module 230 or the voice integrated platform 240. For example, a reuse of the first trunk member 260 may be an automated response initiated by the system access module 230 or the voice activated platform 240 based on an action of the second remote device 220. Alternatively, the system access module 230 or the voice integrated platform 240 may be coded to enable reuse based on talk time or a type of calling plan chosen by the calling party.

Figure 3:
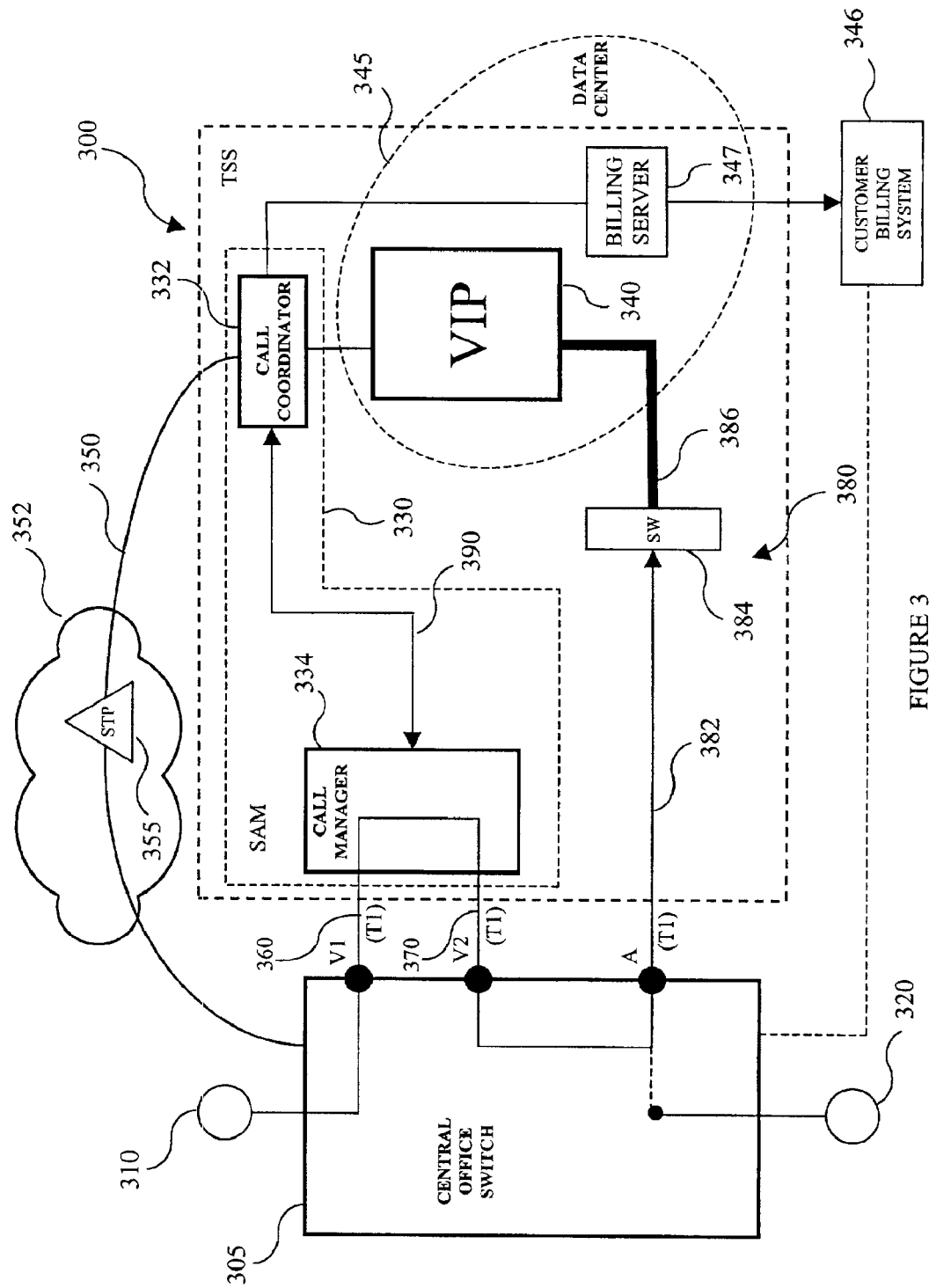
FIG. 3 illustrates a block diagram of an another embodiment of a telephony server system in an environment of a telecommunications network constructed according to the principles of the present invention.

Turning now to FIG. 3, illustrated is a block diagram of an embodiment of a telephony server system 300 in an environment of a telecommunications network constructed according to the principles of the present invention. The telephony server system 300 is coupled to a telecommunications central office switch 305 that is, in turn, coupled to a first remote device 310 and a second remote device 320.

The telephony server system 300 includes a system access module 330 and a voice integrated platform 340. The telecommunications network includes a data center 345 and a customer billing system 346. The data center 345 includes a billing server 347. The telephony server system 300 is coupled to the telecommunications central office switch 305 using a Signaling System Seven (SS7) link 350 employing a network 352 which includes a Signaling Transfer Point (STP) 355.

The system access module 330 includes a call coordinator 332 and a call manager 334. The call coordinator 332 is coupled to the call manager 334 through a control link 390. The call manager 334 is coupled to the telecommunications central office switch 305 through a first trunk member 360 at a port V1 and a second trunk member 370 at a port V2. The voice integrated platform 340 is coupled to the telecommunications central office switch 305 through a voice command link 380 at a port A. The voice command link 380 includes a third trunk member 382, a third party switch 384 and a voice path connection 386.

Essentially, the telephony server system 300 may function as the telephony server system 200 described above with respect to FIG. 2. The telecommunications central office switch 305 may be a conventional telecommunications central office switch for processing land line calls that does not have the capability of a single trunk member being used for a local call or a long distance call. Instead, the telecommunications central office switch 305 may use different trunk members for a local call and a long distance call. Alternatively, the telecommunications central office switch 305 may be configured to provide wireless communications.

Additionally, the call coordinator 332 and the voice integrated platform 340 are located remotely from the telecommunications central office switch 305 in FIG. 3. While the call coordinator 332 is illustrated outside of the data center 345, it should be understood that the call coordinator 332 may also be located within the data center 345 with the voice integrated platform 340. In other embodiments, the call coordinator 332 may be located remotely from the telecommunications central office switch 305 and the voice integrated platform 340. The data center 345 may be a conventional data center that provides data storage. The location of the data center 345 may vary. For example, the data center 345 may be located within blocks of the telecommunications central office switch 305. The data center 345, however, may also be located in a different state from the telecommunications central office switch 305. In some embodiments, the call coordinator 332 may be a sequence of operating instructions embodied within the voice integrated platform 340. The call coordinator 332, however, still preferably controls the set-up and tear down of the first trunk member 360, the second trunk member 370 and the voice command link 380.

The voice integrated platform 340 includes a voice activated front end and, similar to the voice integrated platform 240 discussed above with respect to FIG. 2, the voice integrated platform 340 may provide Voice Activated Dialing (VAD). In other embodiments, the voice integrated platform 340 may provide information to the calling party. In one embodiment, the voice integrated platform 340 may provide 411 call completion. In this embodiment, the calling party may request a telephone number for a particular party, such as a person or a business, in a certain city. The voice integrated platform 340 may determine the desired telephone number from its own database or the voice integrated platform 340 may contact an Operator Service Provider (OSP) and obtain the telephone number therefrom. After obtaining the desired telephone number, the voice integrated platform 340 may then send information regarding the telephone number to the call coordinator 342 of the system access module 330, which directs the telecommunications central office switch 305 to complete the 411 call. Since the telecommunications central office switch 305 completes the 411 call between the calling party and the particular party, then the 411 call is delivered with a proper caller identification (ID) indicating the calling party. In other embodiments, the voice integrated platform 340 may provide other information to the calling party in addition to telephone numbers such as weather reports, sporting event scores, market reports, etc.

When the first remote device 310 is a wireless device such as a cellular telephone, then the system access module 330 may also deliver at least a portion of the call parameters, such as a telephone number, of the 411 call to the first remote device 310 via Short Message Service (SMS). SMS is commonly used with wireless devices and understood by one skilled in the art. In some embodiments, the system access module 330 may also send an address or an advertisement. The system access module 330, therefore, may provide completion of the 411 call and also provide information about the particular party for a future call by the calling party. In some embodiments, the first remote device 310 may be able to place a call to the particular party using the telephone number received via SMS without entering the telephone number. Through one telephone call, therefore, the system access module 330 may complete the 411 call to the particular party with the correct caller ID for the calling party and also provide information about the particular party to the calling party for a possible future call to the particular party.

In the illustrated embodiment, the call coordinator 342 is coupled to the billing server 347. The billing server 347 may be a conventional server designated for storing billing data. In a preferred embodiment, the billing server 347 may employ Automatic Message Accounting (AMA) to store billing data. AMA is an established Bellcore standard for billing documents. One skilled in the art will understand AMA billing data.

Typically, the customer billing system 346 is located remotely from the data center 345. The customer billing system 346 may simply be a designated location that receives and processes the billing information from telecommunications central office switches such as the telecommunications central office switch 305. In a preferred embodiment, the call coordinator 342 may send information detailing calls coordinated by it to the customer billing system 346. The call coordinator 342 may send the call information to the customer billing system 346 via several methods and employing, for instance, SS7 or IP related protocols. The billing server 347 may provide billing information to the customer billing system 346 in addition to the billing information provided by the telecommunications central office switch 305. In one embodiment, the billing information provided by the billing server 347 may be a billing tape. The billing server 347 may allow proper billing for the telecommunications central office switch 305 regardless of the manufacturer.

The voice command link 380 also differs from the voice command link 280 of FIG. 2. In FIG. 3, the voice command link 380 includes the third trunk member 382, the third party switch 384 and the voice path connection 386. The third trunk member 382 provides a physical link out of the telecommunications central office switch 305 to the third party switch 384. The third party switch 384 then provides a connection between the third trunk member 382 to the voice path connection 386. The voice path connection 386 completes the voice command link 380 between the telecommunications central office switch 305 and the voice integrated platform 340. In other embodiments, the voice command link 380 may employ a Voice Over Internet Protocol (VoIP) connection between the telecommunications central office switch 305 and the voice integrated platform 340. A VoIP connection is well known within the art.

The third trunk member 382 may be a conventional trunk member of a trunk group that is capable of long distance calls from the telecommunications central office switch 305. The third trunk member 382 may be a direct link between the telecommunications central office switch 305 and the third party switch 384. In other embodiments, the third trunk member 382 may employ a conventional telecommunications network employing SS7 signaling.

The third party switch 384 may be a conventional telecommunications switch of a long distance company designated by the operator of the voice integrated platform 340. The third party switch 384 allows the voice integrated platform 340 owner to designate a long distance company to provide a connection to the voice integrated platform 340. The third party switch 384 is capable of receiving a voice channel on a conventional trunk member from a telecommunications network and then providing the voice channel to the voice integrated platform 340 employing, for instance, an Integrated Services Digital Network Primary Rate Interface (ISDN PRI) service. The voice path connection 386 may be a conventional ISDN PRI connection. In other embodiments, the voice path connection 386 may be a conventional trunk line which employs SS7 signaling.

Figure 4:
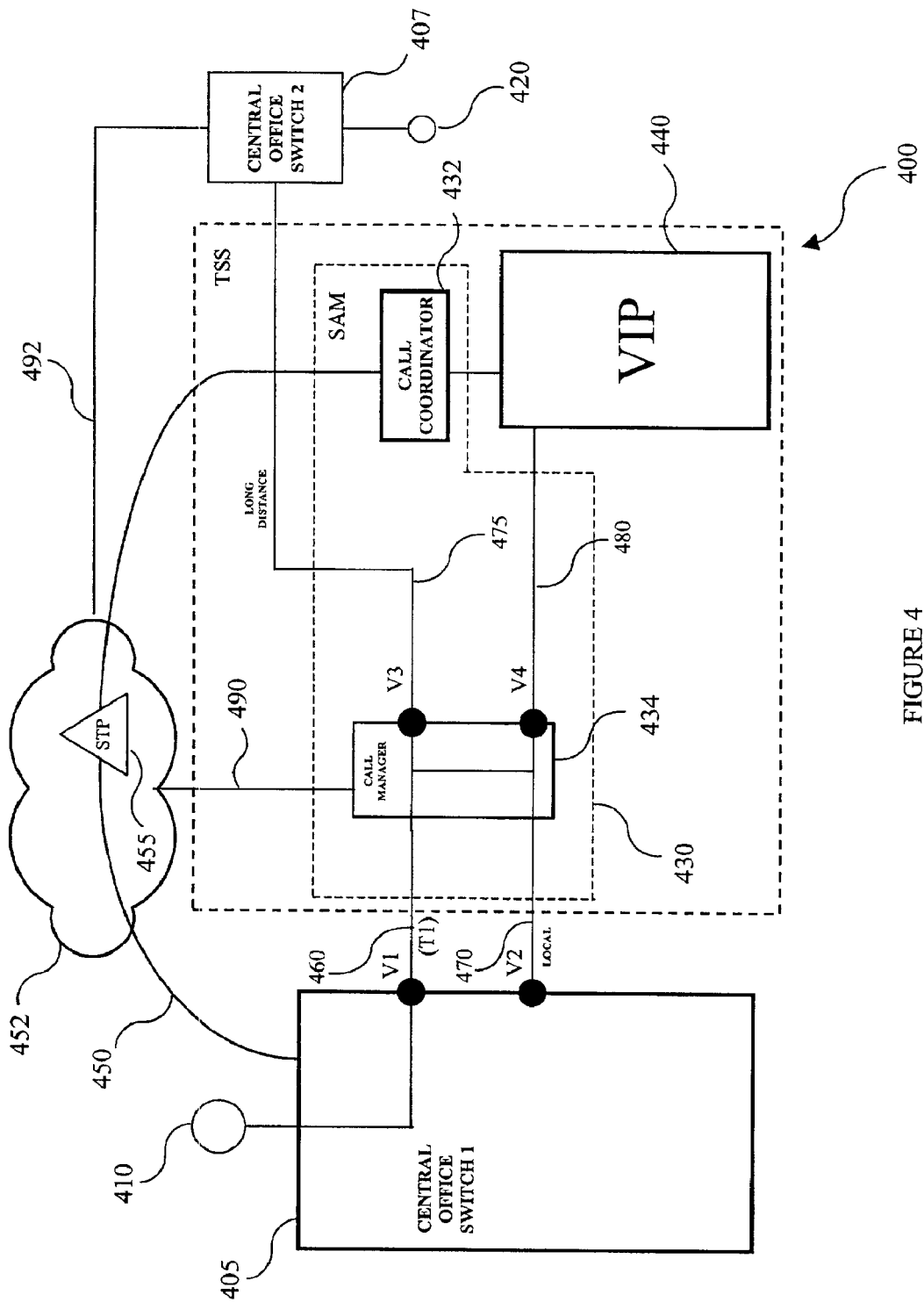
FIG. 4 illustrates a block diagram of an additional embodiment of a telephony server system in an environment of a telecommunications network constructed according to the principles of the present invention.

Turning now to FIG. 4, illustrated is a block diagram of an embodiment of a telephony server system 400 in an environment of a telecommunications network constructed according to the principles of the present invention. The telecommunications network includes a first telecommunications central office switch 405 and a second telecommunications central office switch 407. The telephony server system 400 is coupled to the first telecommunications central office switch 405 that is, in turn, coupled to a first remote device 410. The telephony server system 400 is also coupled to the second telecommunications central office switch 407 which is coupled to a second remote device 420. The telephony server system 400 includes a system access module 430 and a voice integrated platform 440. The telephony server system 400 is coupled to the first telecommunications central office switch 405 using a first Signaling System Seven (SS7) link 450 employing a network 452 which includes a Signaling Transfer Point (STP) 455. The telephony server system 400 is also connected to the second telecommunications central office switch 407 via a second SS7 link 492. The first SS7 link 450 and the second SS7 link 492 are SS7 A-links. In other embodiments, the first SS7 link 450 and the second SS7 link 492 may be SS7 F-links.

The system access module 430 includes a call coordinator 432 and a call manager 434. The call coordinator 432 is coupled to the call manager 434 through a control link 490. In this embodiment, the control link 490 is an SS7 A-link. The call manager 434 is coupled to the first telecommunications central office switch 405 through a first trunk member 460 at a port V1 and a second trunk member 470 at a port V2. The call manager 434 is coupled to the second telecommunications central office switch 407 through a third trunk member 475 at a port V3. The voice integrated platform 440 is coupled to the call manager 434 through a voice command link 480 at a port V4.

FIG. 4 illustrates another embodiment of a system access module within a telephony server. In FIG. 4, there may by four trunk groups associated with the call manager 434 as represented by the first trunk member 460, the second trunk member 470, the third trunk member 475 and the voice command link 480. For example, the first trunk member 460 may include five trunk lines, the second trunk member 470 and the third trunk member 475 may include four trunk lines each and the voice command link 480 may include two trunk lines. Typically, a trunk member from one of the trunk lines provides a voice path from the first remote device 410 to the call manager 434. Similarly, the second trunk member 470 may provide a voice path to the first telecommunications central office switch 405 for a local call. The third trunk member 475 may be used to provide a long distance call to the second remote device 420.

The second telecommunications central office switch 407 may assist in completing the long distance call over the third trunk member 475 to the second remote device 420. In other embodiments, other telecommunications central office switches may also be employed to complete the long distance call to the second remote device 420. The second telecommunications central office switch 407, like the first telecommunications central office switch 405, may be a conventional telecommunications central office switch.

The call coordinator 432 may be used to control the switching of the first trunk member 460, the second trunk member 470, the third trunk member 475 and the voice command link 480. In addition, the call coordinator 432 may be used to control the switching of the second telecommunications central office switch 407 to complete the long distance call to the second remote device 420. The call coordinator 432 may employ SS7 signaling in performing the aforementioned functionality. For example, the call coordinator 432 may receive and send ISDN User Part (ISUP) messages through the network 452 and/or the control link 490 to facilitate the set-up and tear-down of calls. The call coordinator 432 may also employ SS7 signaling to facilitate the switching functions by communicating with the call manager 434 using a protocol on top of a Transactional Capabilities Application Part (TCAP).

Figure 5:
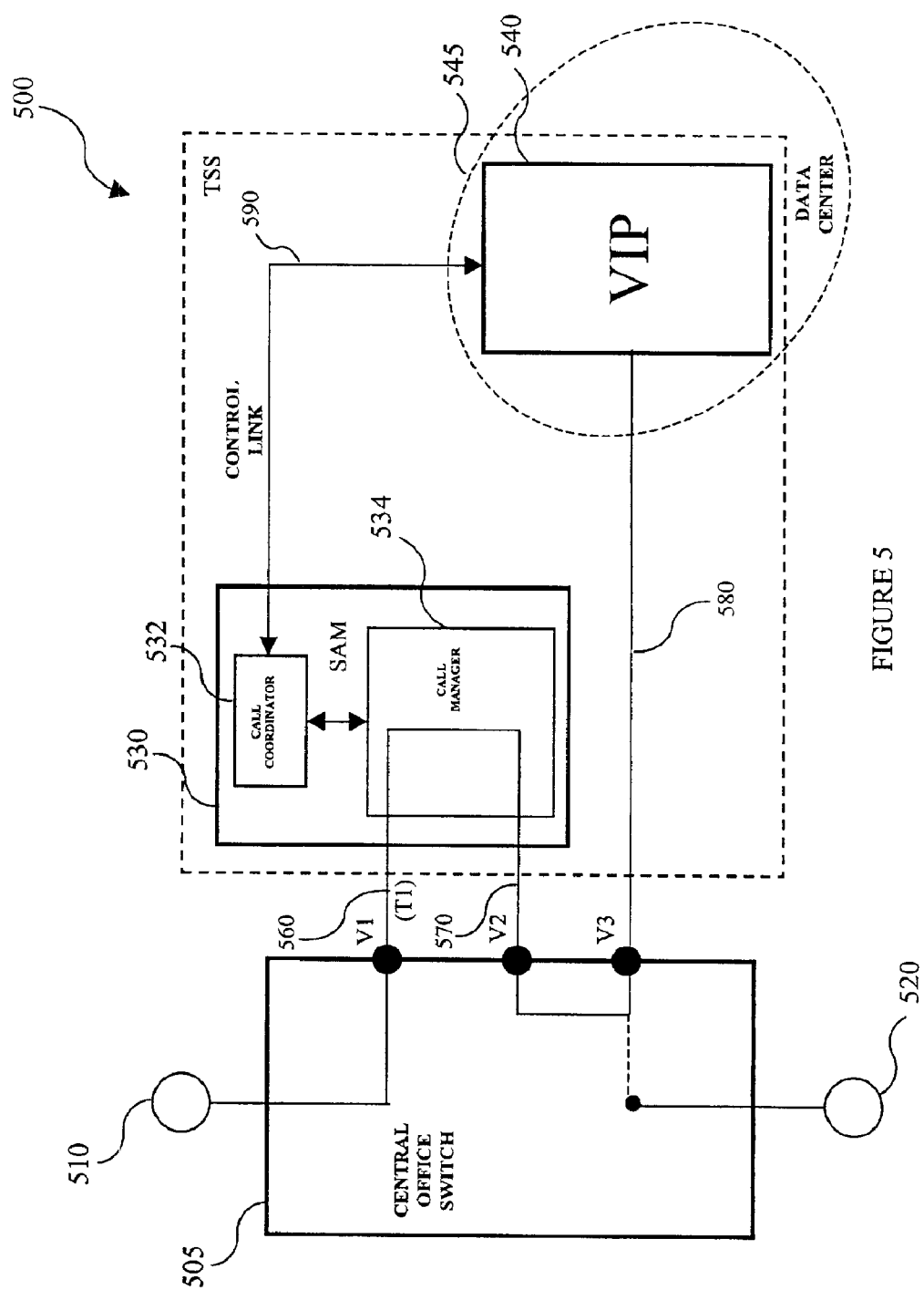
FIG. 5 illustrates a block diagram of a different embodiment of a telephony server system in an environment of a telecommunications network constructed according to the principles of the present invention.

Turning now to FIG. 5, illustrated is a block diagram of an embodiment of a telephony server system 500 in an environment of a telecommunications network constructed according to the principles of the present invention. The telephony server system 500 is coupled to a telecommunications central office switch 505 that is, in turn, coupled to a first remote device 510 and a second remote device 520. The telephony server system 500 includes a system access module 530 and a voice integrated platform 540.

The system access module 530 includes a call coordinator 532 and a call manager 534. The call manager 534 is coupled to the telecommunications central office switch 505 through a first trunk line 560 at a port V1 and a second trunk line 570 at a port V2. The voice integrated platform 540 is coupled to the telecommunications central office switch 505 through a third trunk line 580 at a port V3. The voice integrated platform 540 is also connected to the system access module 530 through a control link 590. The voice integrated platform 540 may be located within a data center 545.

The telecommunications central office switch 505 may be any conventional telecommunications switch that employs, for instance, ISDN PRI service and has the capability of making a local and a long distance phone call on the same trunk line. The first remote device 510 and the second remote device 520 may be conventional land line telephones. Of course, the first remote device 510 and the second remote device 520 may be some other types of communication devices. The first trunk line 560, the second trunk line 570 and the third trunk line 580 may be conventional ISDN PRI trunk lines having a single D channel and twenty three B channels. The D channel may be used to carry signaling and the B channel may be used as a voice channel. In other embodiments, the first trunk line 560, the second trunk line 570 and the third trunk line 580 may include additional B channels.

The control link 590 may be a conventional IP connection which is used for communicating control information between the system access module 530 and the voice integrated platform 540. The telephony server system 500 may also employ a second control link as a back-up. In one embodiment, the second control link may be a conventional POTS line.

The system access module 530 may be a dedicated system that is constructed of special-purpose hardware employing a sequence of operating instructions, which directs its operation. Similarly, the call coordinator 532 and the call manager 534 may be embodied within the system access module 530. In other embodiments, the system access module 530 may be employed in a system that is solely hardwired or that is solely software enabled using general purpose hardware. In one embodiment, the system access module 530 may be a sequence of operating instructions employed on a general purpose computer.

The voice integrated platform 540 may be similar to the voice integrated platforms discussed with respect to FIGS. 2-4. In FIG. 5, the voice integrated platform 540 is located remotely from the telecommunications central office switch 505 and the system access module 530. In some embodiments, the remotely located voice integrated platform 540 may provide service to a plurality of system access modules and telecommunications central office switches. In other embodiments, the voice integrated platform 540 may be located proximate the telecommunications central office switch 505.

The operation of the telephony server system 500 is similar to the operation of the telephony server system 200 as described above with respect to FIG. 2 having an ISDN PRI service employable for setting up and tearing down calls. In addition, the control signals may be sent through D channels of corresponding trunk lines instead of through SS7 links. Since controlling telephone calls using ISDN PRI service is well known within the art, the following discussion will not concentrate on the messages that are sent and received, but will simply address the function of each element. For example, a calling party may use the first remote device 510 to initiate a call to the voice integrated platform 540. The calling party may initiate the call by depressing a designated key or sequence of keys for the voice integrated platform 540. Alternatively, the first remote device 510 may employ a warm line which may automatically initiate a call to the voice integrated platform 540 when a key is not activated after a predetermined amount of time. The system access module 530 will answer the call and send the call to the voice integrated platform 540 through the second trunk line 570 and the third trunk line 580.

Typically, when the system access module 530 answers the call from the first remote device 510, the system access module 530 will send a signal to the voice integrated platform 540 through the control link 590. The signal will contain information about the call from the first remote device 510 including how the call relates to the calling party. When the voice integrated platform 540 receives the call through the third trunk line 580, the voice integrated platform 540 may respond with an audible statement such as "Welcome." The calling party may then state "Call John" which causes the voice integrated platform 540 to determine the phone number of John from, for instance, a phone number directory of the calling party. The voice integrated platform 540 may then send John's phone number to the system access module 530. The system access module 530 may then drop the third trunk line 580 to the voice integrated platform 540 and connect the calling party to John at the second remote device 520. The call between the first remote device 510 and the second remote device 520 is now established over a voice communication path which includes the first trunk line 560, the second trunk line 570 and a path through the call manager 534 of the system access module 530. The path through the call manager 534 may allow the first trunk line 560 to be reused.

Figure 6:
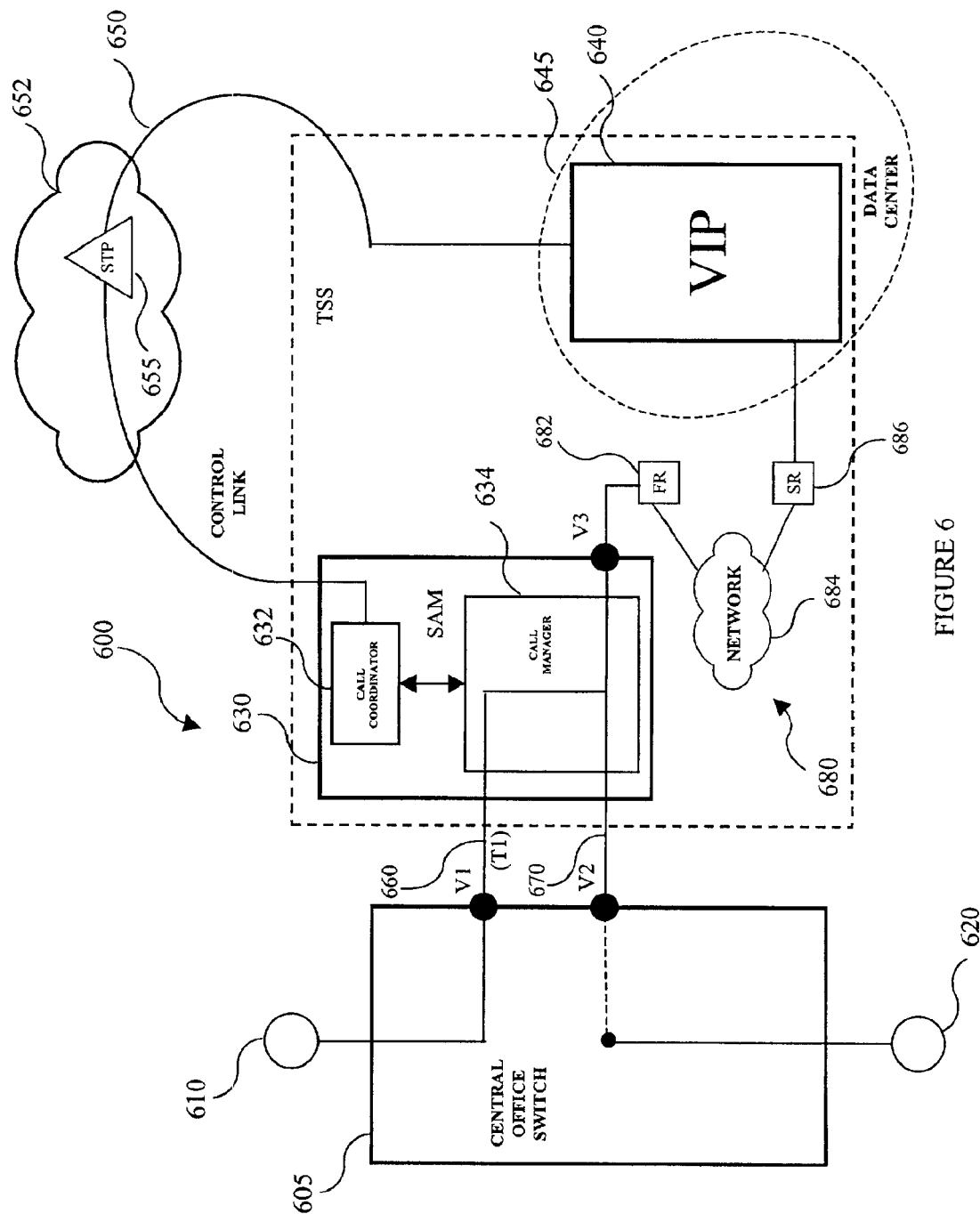
FIG. 6 illustrates a block diagram of yet another embodiment of a telephony server system in an environment of a telecommunications network constructed according to the principles of the present invention.

Turning now to FIG. 6, illustrated is a block diagram of an embodiment of a telephony server system 600 in an environment of a telecommunications network constructed according to the principles of the present invention. The telephony server system 600 is coupled to a telecommunications central office switch 605 that is, in turn, coupled to a first remote device 610 and a second remote device 620. The telephony server system 600 includes a system access module 630 and a voice integrated platform 640. The telecommunications network includes a data center 645.

The system access module 630 includes a call coordinator 632 and a call manager 634. The call manager 634 is coupled to the telecommunications central office switch 605 through a first trunk line 660 at a port V1 and a second trunk line 670 at a port V2. The voice integrated platform 640 is coupled to the system access module 630 through a voice command link 680 at a port V3. The voice command link 680 includes a first router 682, an Internet Protocol (IP) network 684 and a second router 686. The voice integrated platform 640 is also connected to the system access module 630 through a Signaling System Seven (SS7) control link 650. The SS7 control link 650 employs a network 652 which includes a Signaling Transfer Point (STP) 655.

The telecommunications central office switch 605 may be any conventional telecommunications central office switch that is capable of employing ISDN PRI service. The first remote device 610 and the second remote device 620 may be conventional communication devices such as laptop computers with the capability of sending and receiving voice communications. The first trunk line 660 and the second trunk line 670 may be conventional ISDN PRI trunk lines having a single D channel used for signaling and twenty three B channels used for as voice channels.

The system access module 630 may be a dedicated system that is constructed of special-purpose hardware employing a sequence of operating instructions, which directs its operation. Similarly, the call coordinator 632 and the call manager 634 may be embodied within the system access module 630.

The voice integrated platform 640 may be a conventional voice integrated platform similar to the voice integrated platform 240 in FIG. 2. In FIG. 6, the voice integrated platform 640 is remotely located from the telecommunications central office switch 605 and the system access module 630 at the data center 645. In other embodiments, the voice integrated platform 640 may be at a remote location other than the data center 645.

The voice command link 680 provides a voice link between the system access module 630 and the voice integrated platform 640 to complete a voice path between the first remote device 610 and the voice integrated platform 640. The voice command link 680 may be a conventional Voice Over Internet Protocol (VoIP) connection. The first router 682 and the second router 686 may be conventional routers which may direct vocal data through the IP network 684. The IP network 684 may be a conventional telecommunications network employing an IP related protocol. For example, the IP network 684 may be the Internet. The call coordinator 632 may control the switching of the B channels by the call manager 634 using time switching which is a common method one skilled in the art will understand.

The operation of the telephony server system 600 is similar to the operation of the telephony server system 500 as described above with respect to FIG. 5. In FIG. 6, the call coordinator 632 establishes the voice command link 680 through the system access module 630 employing the call manager 634. The system access module 630 has the capability to switch calls between different B-channels of the first trunk line 660 and the second trunk line 670 or to the voice command link 680.

In addition, the telephony server system 600 may employ a SS7 control link 650 between the system access module 630 and the voice integrated platform 640 as a control link instead of IP connection. As discussed above with respect to FIG. 5, the telephony server system 600 may employ a back-up control link. In one embodiment, the back-up control link may be an IP connection.

Figure 7:
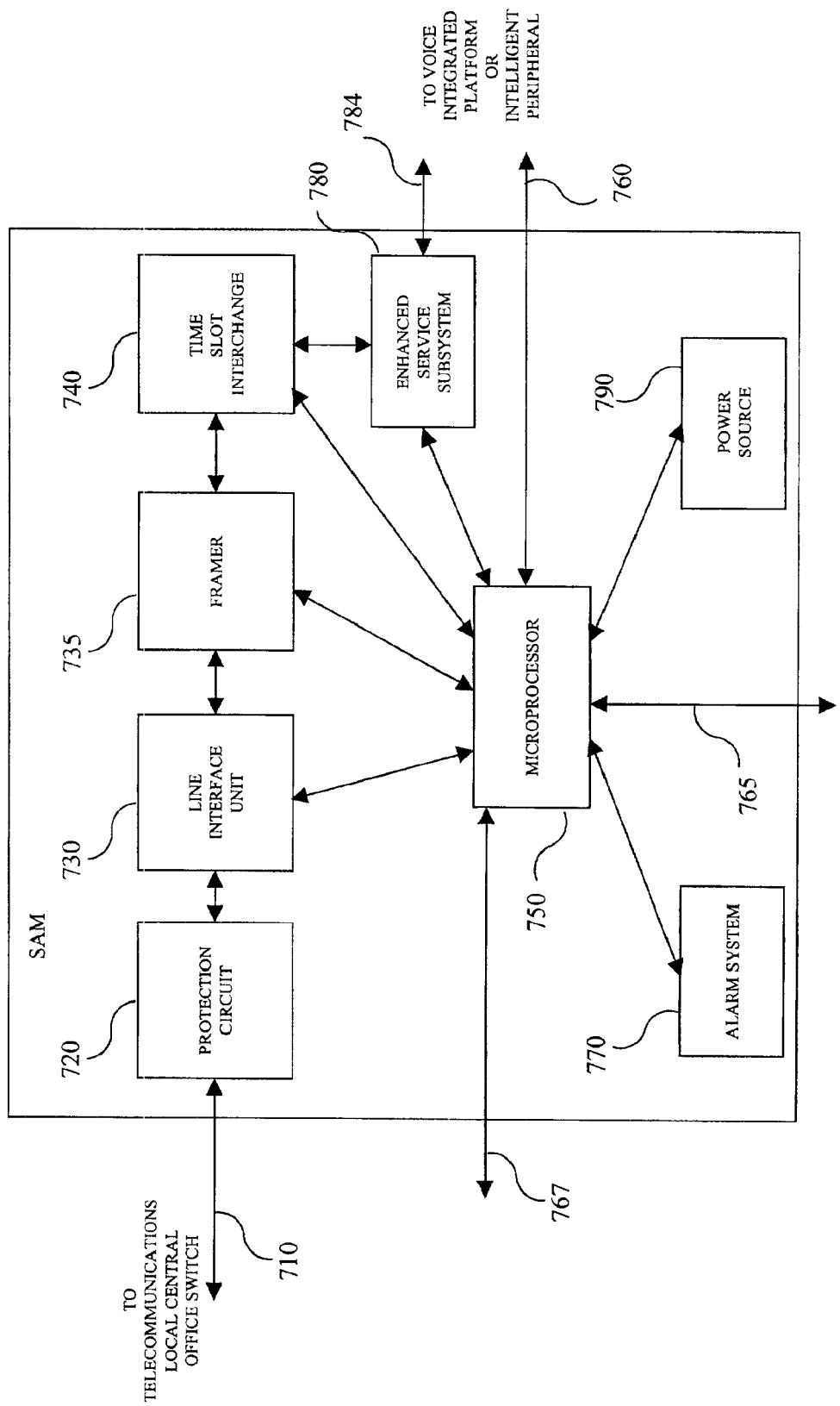
FIG. 7 illustrates a block diagram of an embodiment of a system access module constructed according to the principles of the present invention.

Turning now to FIG. 7, illustrated is a block diagram of an embodiment of a system access module, generally designated 700, constructed in accordance with the principles of the present invention. The system access module 700 includes a protection circuit 720, a line interface unit 730, a framer 735, a time slot interchange 740, a microprocessor 750, an alarm system 770, an enhanced service subsystem 780 and a power source 790.

The system access module 700 is coupled to a telecommunications central office switch via a first connection (designated 710). The first connection 710 may be a medium that provides a voice path between the telecommunications central office switch and the system access module 700. In one embodiment, the first connection 710 may include trunk groups. In another embodiment, the first connection 710 may include two single trunk lines. In some embodiments, the first connection 710 may employ ISDN PRI. Typically, the first connection may be T1 or E1 links.

The protection circuit 720 may associate with a conventional physical layer (Layer 1 of the Open Systems Interconnect architecture) to provide a physical connection for the system access module 700. Typically, the protection circuit 720 may include surge protection circuitry to prevent lightning surges from having an effect on the system access module 700. Additionally, the protection circuit 720 may employ a transformer to assist in electrically isolating the system access module 700 from other devices and prevent the system access module 700 from adversely affecting the first connection 710 or the telecommunications central office switch. An additional protection circuit 720 may be added for each trunk group or trunk line coupled to the system access module 700.

The line interface unit 730 converts data from analog to digital and vice versa. For example, the line interface unit 730 may receive an analog data signal, or telephone call, from the telecommunications central office switch via the first connection 710 and the protection circuit 720. The first connection 710 may include a first T1 and a second T1 with the analog data signal on a single channel such as circuit one of the first T1. The analog data signal may be a Time Division Multiplexed (TDM) data string encoded, for example, employing Alternate Mark Inversion (AMI) or Binary Eight Zero Substitution (B8ZS). Additionally, the framing format may be, for instance, a super frame (SF) or extended super frame (ESF) format. The line interface unit 730 modifies the pulse shape of the received analog data signal to create a square wave representing a series of one and zeros. Essentially, the line interface unit 730 may convert the analog data signal into an equivalent stream of one and zeros to be sent to the framer 735.

The framer 735 receives the stream of one and zeros from the line interface unit 730 and removes the framing data, such as framing bits, resulting in a payload data of eight bits for each particular time slot of circuit one. In a preferred embodiment, the framer 735 may receive a serial stream having the data (ones and zeros) from eight T1's. The framer 735 may then send the payload data to the time slot interchange 740 for further processing. The framer 735 may include at least one SLIP buffer to compensate for any possible SLIP between a T1 circuit such as the first connection 710 and the time slot interchange 740. In some embodiments, an additional framer and line interface unit may be employed for each trunk line coupled to the system access module 700. In a preferred embodiment, the framer 735 and the line interface unit 730 may be embodied within a single device. Of course one skilled in the art will understand that the line unit interface 730 and the framer 735 may also process data being sent from the system access module 700. For example, the framer 735 may add the proper framing bits to payload data received from the time slot interchange 740.

The time slot interchange 740 may be coupled to the framer 735 by at least one serial bus. In a preferred embodiment, the framer 735 and the time slot interchange 740 may be coupled by a serial bus for each T1 of the first connection 710. In a preferred embodiment, the operation of the time slot interchange 740 may be controlled by the microprocessor 750. The time slot interchange 740 may receive the payload data from the framer 735 and process the payload data one time slot at a time. The time slot interchange 740 may process the payload data by what is commonly referred to in the industry as a time switch. For example, the first connection 710 may include the first T1 and the second T1 with each T1 containing twenty four time slots. The time slot interchange 740 may store the payload data received via a time slot of circuit one of the first T1 into a memory location of the time slot interchange 740 and then switch the stored payload data to a designated time slot of the second T1. In some embodiments, the time slot interchange 740 may always switch a time slot of the first T1 to a designated time slot of the second T1. In other embodiments, the microprocessor 750 may employ the enhanced service subsystem 780 with the time slot interface 740 to provide services such as call conferencing and call blasting. In these embodiments, the payload data may be sent from the memory locations of the time slot interchange 740 to the enhanced service subsystem 780 for processing. Essentially, the time slot interchange 740 allows the interchange of payload data between various time slots of the first connection 710.

The microprocessor 750 may be a conventional microprocessor that may control the line interface unit 730, the framer 735, the time slot interchange 740, the alarm system 770 and the enhanced service subsystem 780. For example, the microprocessor 750 may configure the framer 735 to add the proper framing to the payload data received from the time slot interchange 740. The microprocessor 750 may configure the framer 735 for processing several framing formats including SF or ESF.

The microprocessor 750 may also communicate with other systems such as a voice integrated platform via a communication link (designated 760). The microprocessor 750 may instruct the time slot interchange 740 to switch the payload data in the time slots based on commands received through the communication link 760. In addition, the microprocessor 750 may control the time slot interchange 740 via a signaling link (designated 767). The signaling link 767 may employ SS7 protocol. The microprocessor 750 may also be coupled to an auxiliary link (designated 765) via a modem to allow remote maintenance and provide support for troubleshooting. The communication link 760 may also be used to allow remote maintenance and troubleshooting.

The communication link 760 may employ an IP connection such as the Internet. In addition, the communication link 760 may employ SS7 links such as an A-link or an F-link. In one embodiment, the communication link 760 may couple the system access module 700 to the voice integrated platform. In this embodiment, the communication link 760 may provide a path for a data signal containing, for example, a telephone number of a called party received from the voice integrated platform. In other embodiments, the communication link 760 may couple the system access module 700 to an intelligent peripheral. An intelligent peripheral may be a system which may also employ a voice activated front end. For example, the intelligent peripheral may be a prepaid calling system, a unified messaging system, an email reader system or a content provider system.

The alarm system 770 may be a conventional alarm system designed to protect the system access module 700. In one embodiment, the alarm system may notify a designated party of a potential problem or failure. In a preferred embodiment, the alarm system 770 may be integrated into the alarm system of a telecommunications central office switch. Typically, an alarm contact associated with the telecommunications central office switch may be opened upon receiving a signal from the microprocessor 750.

The enhanced service subsystem 780 may be a plurality of digital signal processors (DSP) dedicated to perform certain functions. In some embodiments, the enhanced service subsystem 780 may be a dedicated hardwired device. The enhanced service subsystem 780 may provide features such as sending at least a portion of call parameters of a voice communication path to a remote device via SMS. The enhanced service subsystem 780 may also provide, for example, call conferencing. For example, a calling party may request call conferencing from the voice integrated platform by stating "Conference Call Management Team." The voice integrated platform may then send control signals to the enhanced service subsystem 780 of the system access module 700 via the communication link 760 indicating the telephone numbers of the management team. The enhanced service subsystem 780 may cooperate with the microprocessor 750 to coordinate connecting each member of the management team to the calling party employing the time slot interchange 740. The enhanced service subsystem 780 may establish a single conference call or multiple conference calls. Thus the system access module 700 may facilitate a conference call by establishing a conference bridge proximate to the telecommunications central office switch. The conference bridge may even be established proximate the telecommunications central office switch if call conferencing intelligence is located remotely from the telecommunications central office switch. For instance, the voice integrated platform may be located at a data center.

The enhanced service subsystem 780 may also be coupled to the voice integrated platform via a second connection (designated 784). In preferred embodiments, the second connection 784 may employ Voice Over Internet Protocol (VoIP). The enhanced service subsystem 780 may employ the second connection 784 and the voice integrated platform to provide call blasting. For example, the calling party may initiate a call to the voice integrated platform indicating a local emergency. The voice integrated platform may then send control signals to the system access module 700 containing information such as telephone numbers of residents in the local area and a voice message. The control signals may be sent via the communication link 760, the signal link 767 or the first connection 710. The voice message may be sent via the second connection 784. The enhanced service subsystem 780 may then cooperate with the microprocessor 750 and the time slot interchange 740 to simultaneously contact each resident and play the voice message from the voice integrated platform. In some embodiments, the residents may be contacted sequentially.

The power source 790 provides power for the system access module 700. In one embodiment, the power source 790 may be a conventional 48 volt DC power source. In a preferred embodiment, the power source 790 may utilize the same power source as used by a telecommunications central office switch.

Figure 8:
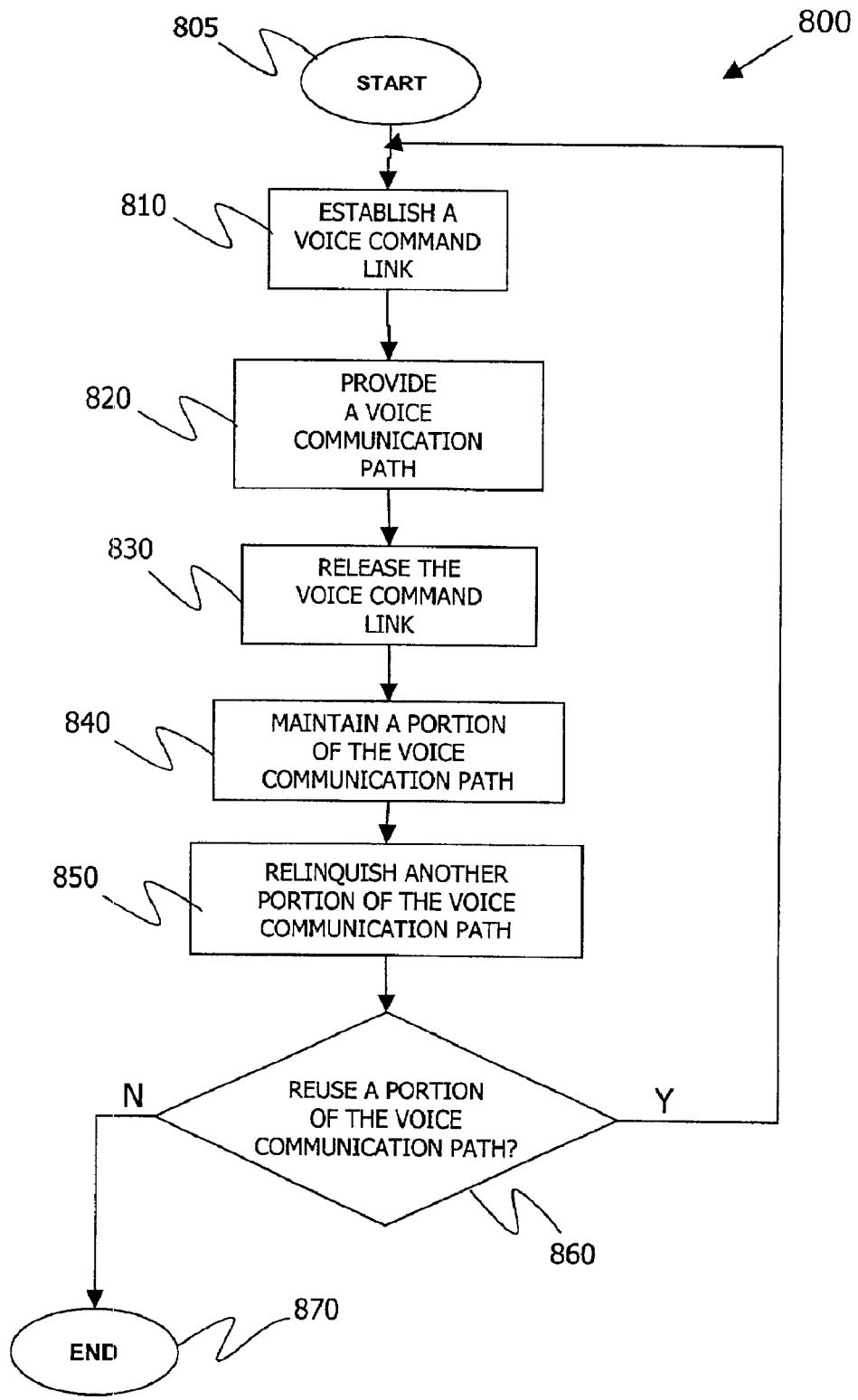
FIG. 8 illustrates a flow diagram of an embodiment of a method of enabling a communication session, constructed according to the principles of the present invention.

Turning now to FIG. 8, illustrated is a flow diagram of an embodiment of a method, generally designated 800, of enabling a communication session, constructed according to the principles of the present invention. The method starts in a step 305 with an intent to enable a communication session.

After starting, a voice command link is established in a step 810. Typically, a call coordinator of a system access module may establish the voice command link between a voice integrated platform and a first remote device. In other embodiments, the voice command link may be established between an intelligent peripheral and the first remote device. The voice command link may employ a VoIP connection. In some embodiments, the voice command link may employ a conventional trunk line which may employ an ISDN PRI service and/or SS7 protocol.

In some embodiments, the system access module may establish a last portion of the voice command link through a conventional telecommunications central office switch. In other embodiments, the system access module may establish the last portion of the voice command link through a trunk of the system access module. In one embodiment, the system access module may establish the voice command link employing a long distance company.

After establishing a voice command link, a voice communication path is provided in a step 820. The voice communication path is typically associated with a first remote device and the telecommunications central office switch. The voice communication path may be provided by the call coordinator of the system access module. In some embodiments, the voice communication path may be provided between a first remote device and a second remote device. In other embodiments, the voice communication path may be provided between a first remote device and a content service provider such as weather information, sports information or stock information.

When the voice communication path is provided, the voice command link is released in a step 830. Typically, the call coordinator may release the voice command link. In some embodiments, the voice command link may be released before the voice communication path is established.

Next, a portion of the voice communication path is maintained in a step 840. Typically, a call manager of the system access module may maintain a portion of the voice communication path. The call manager may maintain a portion of the voice communication path by providing a route for the voice communication path through the system access module. A portion of the voice communication path may be maintained before releasing the voice command link.

After maintaining a portion of the voice communication path, another portion of the voice communication path is relinquished in a step 850. In one embodiment, the another portion of the voice communication path may be relinquished by the second remote device hanging-up. In another embodiment, the first remote device may relinquish the another portion of the voice communication path through a designated key.

After another portion of the voice communication path is relinquished, a determination is made if a portion of the voice communication path should be reused in a decisional step 860. Typically, the portion of the voice communication path that may be reused is physically connected through the system access module. In one embodiment, the first remote device may determine to reuse a portion of the voice communication path. The first remote device may initiate reuse of the portion of the voice communication path by a designated key or a voice command. In some embodiments, the first remote device may determine to reuse a portion of the voice communication path before another portion of the voice communication path is relinquished.

If it is determined that a portion of the voice communication path will not be reused, then the method ends in a step 870. Returning now to the decisional step 860, if a portion of the voice communication path will be reused, then the method proceeds to step 810 and continues as before.

Figure 9:
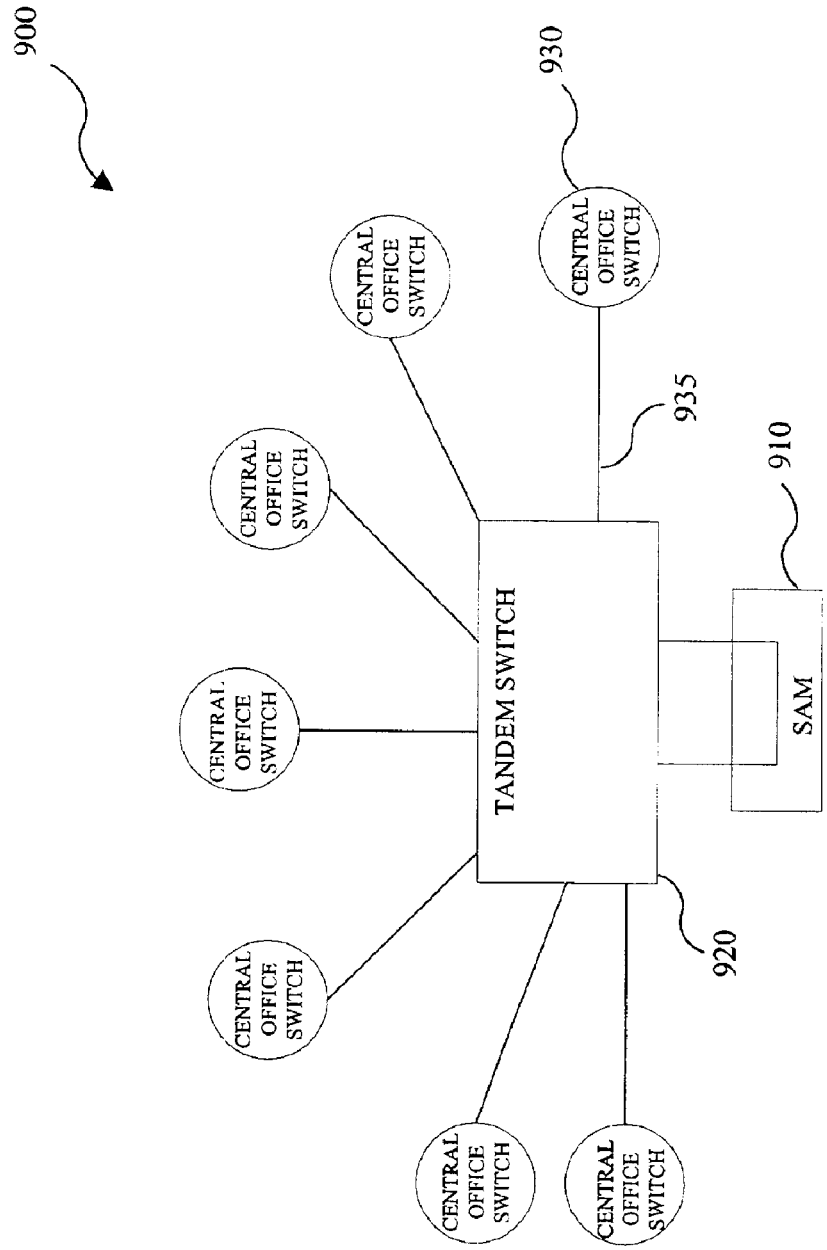
FIG. 9 illustrates a block diagram of an embodiment of a telecommunications network including a system access module constructed according to the principles of the present invention.

Turning now to FIG. 9, illustrated is an embodiment of a telecommunications network 900 including a system access module, generally designated 910, constructed according to the principles of the present invention. The telecommunications network 900 includes a tandem switch 920 and a plurality of telecommunications central office switches (one of which is designated 930). The plurality of telecommunications central office switches 930 are coupled to the tandem switch 920 by trunk lines (one of which is designated 935).

The system access module 910 may be one of the several embodiments discussed above with respect to FIGS. 2–7. The tandem switch 920 is a well known system used in telecommunications networks which provides access to multiple long distance companies at a central connectivity point for telecommunications central office switches. The plurality of telecommunications central office switches 930 may be conventional telecommunications central office switches which have the capability to interact with a tandem switch 920. The trunk lines 935 may be conventional trunk lines which provide a connection between the plurality of switches 930 and the tandem switch 920.

The central connectivity point of the tandem switch 920 allows the single system access module 910 to provide service to the plurality of telecommunications central office switches 930. In another embodiment, the system access module 910 may be coupled to a telecommunications central end office switch, which may be coupled to a plurality of remote switches. The system access module 910 may then coordinate certain functionality associated with the plurality of remote switches.

Figure 10:
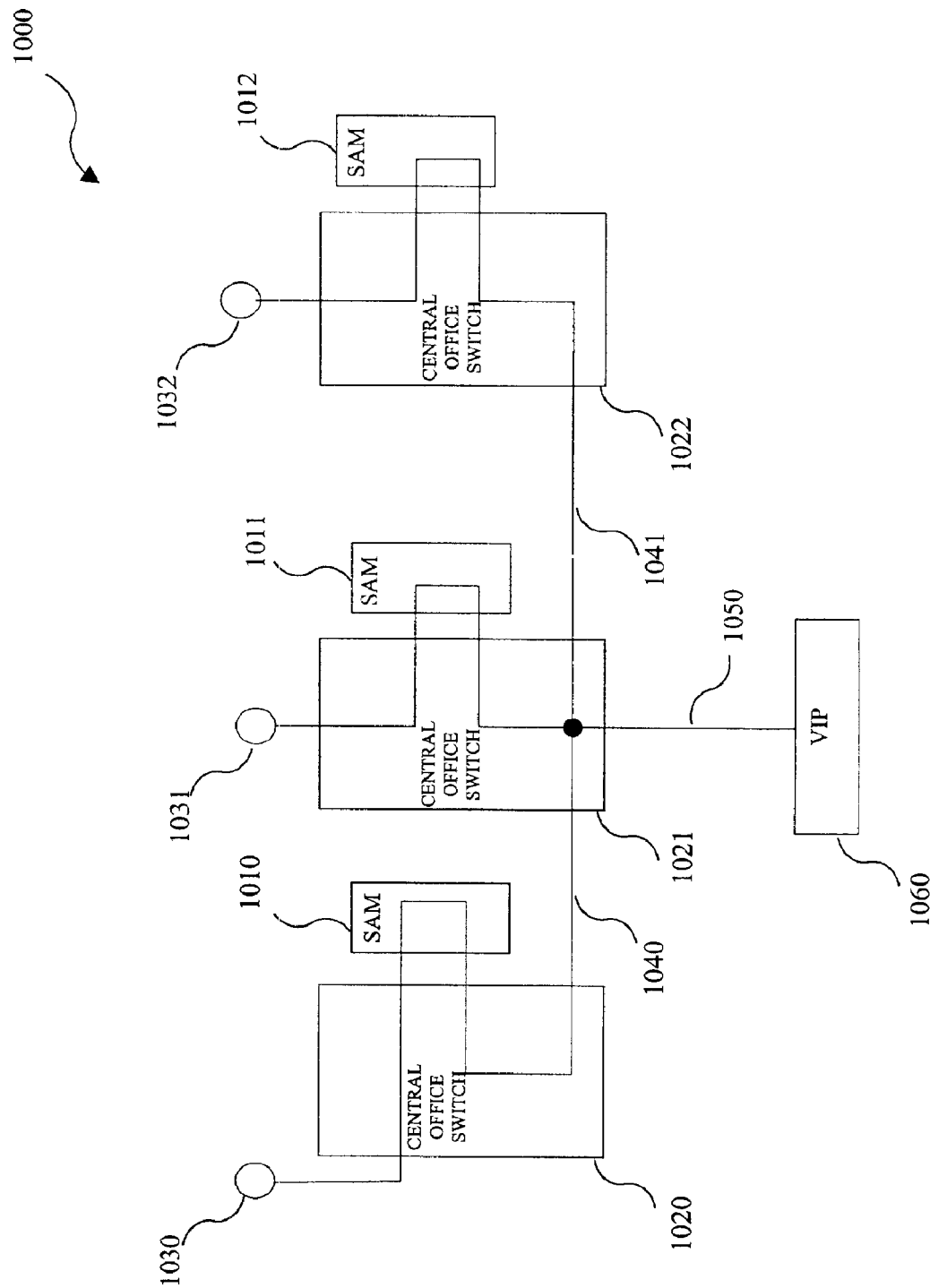
FIG. 10 illustrates a block diagram of another embodiment of a telecommunications network constructed according to the principles of the present invention.

Turning now to FIG. 10, illustrated is an embodiment of a telecommunications network 1000 constructed according to the principles of the present invention. The telecommunications network 1000 includes a first, second and third system access module 1010, 1011, 1012, a first, second and third telecommunications central office switch 1020, 1021, 1022, a first, second and third remote device 1030, 1031, 1032, a first and second intermachine trunk line 1040, 1041, a voice integrated platform trunk line 1050 and a voice integrated platform 1060.

The first, second and third system access module 1010, 1011, 1012, may be one of the various system access module embodiments described above with respect to FIGS. 2–7. The first, second and third telecommunications central office switch 1020, 1021, 1022, may be conventional telecommunications central office switches which may be connected by intermachine trunk lines. The first, second and third system access module 1010, 1011, 1012, may each be of the same design or may vary in architecture and/or design. Similarly, the first, second and third telecommunications central office switch 1020, 1021, 1022, may each be identical switches or may be different switches. In addition, the number of system access modules and telecommunications central office switches may vary.

The first, second and third remote device 1030, 1031, 1032, may be cellular telephones or may be other devices capable of voice communications over the telecommunications network 1000 such as a Personal Digital Assistant (PDA), a handheld computer, a laptop computer, a desktop computer or a conventional land line telephone.

The first and second intermachine trunk line 1040, 1041, may be conventional trunk lines that may be established by a telecommunications company to allow communication therebetween. In the illustrated embodiment, the first and second intermachine trunk line 1040, 1041 employ ISDN PRI service. In other embodiments, the first and second intermachine trunk line 1040, 1041, may be conventional trunk lines which are controlled by SS7 signaling. Similarly, the voice integrated platform trunk line 1050 may be a conventional trunk line employing ISDN PRI service. In alternative embodiments, the voice integrated trunk line 1050 may by controlled by SS7 signaling.

The voice integrated platform 1060 includes a voice activated front end and may provide 411 information. In the illustrated embodiment, the voice integrated platform 1060 is located proximate the second telecommunications central office switch 1021. In other embodiments, the voice integrated platform 1060 may be located remotely from the second telecommunications central office switch 1021.

The telecommunications network 1000 may utilize the first and second intermachine trunk lines 1040, 1041, to provide access to the voice integrated platform 1060 for the first, second and third telecommunications central office switch. The telecommunications network 1000, therefore, may provide functionality of the voice integrated platform 1060 to a plurality of telecommunications central office switches by efficiently using the intermachine trunk lines 1040, 1041.

Although the present invention has been described in detail, those skilled in the art should understand that they can make various changes, substitutions and alterations herein without departing from the spirit and scope of the invention in its broadest form.

What is claimed is:

1. A system access module for use with a voice integrated platform having a voice activated front-end and associated with a telecommunications central office switch, comprising:

a call coordinator, coupled to said voice integrated platform and said telecommunications central office switch, configured to establish, and later release, a voice command link between said voice integrated platform and a remote device, said call coordinator further configured to direct said telecommunications central office switch to establish a voice communication path associated with said remote device employing said voice integrated platform;

a call manager, coupled to said call coordinator, configured to allow reuse of at least a portion of said voice communication path as directed by said remote device; and an enhanced service subsystem configured to deliver at least a portion of call parameters of said voice communication path to said remote device via Short Message Service (SMS).

2. The system access module as recited in claim 1 wherein said call coordinator employs a Signaling System 7 (SS7) protocol.

3. The system access module as recited in claim 1 wherein at least a portion of said system access module is embodied within one of said voice integrated platform and a dedicated system.

4. The system access module as recited in claim 1 wherein said call coordinator is configured to direct said telecommunications central office switch to establish a voice communication path between said remote device and another remote device, said call coordinator being configured to activate said reuse after said another remote device disconnects.

5. The system access module as recited in claim 1 wherein said enhanced service subsystem is further configured to activate said reuse by an action selected from the group consisting of:
    a voice command,
    a keyed command,
    an automated response, and
    a coded response.

6. The system access module as recited in claim 1 wherein said call manager is configured to permit caller identification of said remote device with another remote device.

7. The system access module as recited in claim 1 wherein said voice command link employs a Voice Over Internet Protocol link.

8. The system access module as recited in claim 1 wherein said system access module is proximate said telecommunications central office switch.

9. The system access module as recited in claim 1 wherein said system access module and said telecommunication central office switch are configured to be powered by a like source.

10. The system access module as recited in claim 1 wherein said system access module is configured to employ an alarm system of said telecommunication central office switch.

11. The system access module as recited in claim 1 wherein said enhanced service subsystem is further configured to provide a conference bridge for said remote device.

12. The system access module as recited in claim 1 wherein said enhanced service subsystem is further configured to broadcast a recorded message to a plurality of remote devices.

13. The system access module as recited in claim 1 wherein said system access module is configured to employ an operator service provider (QSP).

14. The system access module as recited in claim 1 wherein said system access module is configured to provide a billing record associated with said voice communication path.

15. A method of enabling a communication session by employing a voice integrated platform having a voice activated front-end and a telecommunications central office switch, comprising:
    establishing a voice command link between said voice integrated platform and a remote device;
    directing said telecommunications central office switch to establish a voice communication path associated with said remote device employing said voice integrated platform;
    releasing said voice command link;
    maintaining at least a portion of said voice communication path to allow reuse as directed by said remote device; and
    delivering at least a portion of call parameters of said voice communication path to said remote device via Short Message Service (SMS).

16. The method as recited in claim 15 wherein said method employs a Signaling System 7 (SS7) protocol.

17. The method as recited in claim 15 wherein at least a portion of said method is performed within one of said voice integrated platform and a dedicated system.

18. The method as recited in claim 15 further comprising directing said telecommunications central office switch to establish a voice communication path between said remote device and another remote device, said maintaining allowing said reuse after said another remote device disconnects.

19. The method as recited in claim 15 wherein said maintaining allows said reuse by an action selected from the group consisting of:
    a voice command,
    a keyed command,
    an automated response, and
    a coded response.

20. The method as recited in claim 15 wherein said directing permits caller identification of said remote device with another remote device.

21. The method as recited in claim 15 wherein said establishing employs a Voice Over Internet Protocol link.

22. The method as recited in claim 15 wherein said method is performed by a system access module located proximate said telecommunications central office switch.

23. The method as recited in claim 22 wherein said system access module and said telecommunication central office switch are powered by a like source.

24. The method as recited in claim 22 wherein said system access module employs an alarm system of said telecommunication central office switch.

25. The method as recited in claim 15 further comprising providing a conference bridge for said remote device.

26. The method as recited in claim 15 further comprising broadcasting a recorded message to a plurality of remote devices.

27. The method as recited in claim 15 wherein said directing employs an operator service provider (OSP).

28. The method as recited in claim 15 further comprising providing a billing record associated with said voice communication path.

29. A system access module for use with a voice integrated platform having a voice activated front end and associated with a telecommunications central office switch, comprising:

means for establishing and later releasing a voice command link between said voice integrated platform and a remote device to direct said telecommunications central office switch to establish a voice communication path associated with said remote device employing said voice integrated platform;

means for allowing reuse of at least a portion of said voice communication path as directed by said remote device; and means for delivering at least a portion of call parameters of said voice communication path to said remote device via Short Message Service (SMS).

30. The system access module as recited in claim 29 wherein said means for establishing employs a Signaling System 7 (SS7) protocol.

31. The system access module as recited in claim 29 wherein said means for establishing is coupled to said means for allowing by employing a Plain Old Telephone Service (POTS).

32. The system access module as recited in claim 29 wherein said means for establishing directs said telecommunications central office switch to establish a voice communication path between said remote device and another remote device, said means for establishing activating said reuse after said another remote device disconnects.

33. The system access module as recited in claim 29 further comprising means for activating said reuse by an action selected from the group consisting of:
a voice command,
a keyed command,
an automated response, and
a coded response.

34. The system access module as recited in claim 29 wherein said means for allowing permits caller identification of said remote device with another remote device.

35. The system access module as recited in claim 29 wherein said voice command link employs a Voice Over Internet Protocol link.

36. The system access module as recited in claim 29 wherein said system access module is proximate said telecommunications central office switch.

37. The system access module as recited in claim 29 wherein said system access module and said telecommunication central office switch are powered by a like source.

38. The system access module as recited in claim 29 wherein said system access module employs an alarm system of said telecommunication central office switch.

39. The system access module as recited in claim 29 further comprising means for providing a conference bridge for said remote device.

40. The system access module as recited in claim 29 further comprising means for broadcasting a recorded message to a plurality of remote device.

41. The system access module as recited in claim 29 wherein said system access module employs an operator service provider (OSP).

42. The system access module as recited in claim 29 further comprising means for providing a billing record associated with said voice communication path.

43. A system access module for use with a prepaid calling system having a voice activated front end and associated with a telecommunications central office switch, comprising:

a call coordinator, coupled to said prepaid calling system and said telecommunications central office switch, configured to establish, and later release, a voice command link between said prepaid calling system and a remote device, said call coordinator configured to direct said telecommunications central office switch to establish a voice communication path associated with said remote device employing said prepaid calling system;

a call manager, coupled to said call coordinator, that allows reuse of at least a portion of said voice communication path as directed by said remote device, and an enhanced service subsystem configured to deliver at least a portion of call parameters of said voice communication path to said remote device via Short Message Service (SMS).

44. The system access module as recited in claim 43 wherein said call coordinator employs a Signaling System 7 (SS7) protocol.

45. The system access module as recited in claim 43 wherein said call coordinator is configured to direct said telecommunications central office switch to establish a voice communication path between said remote device and another remote device, said call coordinator being configured to activate said reuse after said another remote device disconnects.

46. The system access module as recited in claim 43 further comprising an enhanced service subsystem configured to activate said reuse by an action selected from the group consisting of:
a voice command,
a keyed command,
an automated response, and
a coded response.

47. The system access module as recited in claim 43 wherein said call manager is configured to permit caller identification of said remote device with another remote device.

48. The system access module as recited in claim 43 wherein said system access module is proximate said telecommunications central office switch.

49. The system access module as recited in claim 43 further comprising an enhanced service subsystem configured to broadcast a recorded message to a plurality of remote devices.

50. The system access module as recited in claim 43 wherein said system access module is configured to provide a billing record associated with said voice communication path.

51. A method of enabling a communication session by employing a prepaid calling system having a voice activated front-end and a telecommunications central office switch, comprising:

establishing a voice command link between said prepaid calling system and a remote device;

directing said telecommunications central office switch to establish a voice communication path associated with said remote device employing said prepaid calling system;

releasing said voice command link;

maintaining at least a portion of said voice communication path to allow reuse as directed by said remote device, delivering at least a portion of call parameters of said voice communication path to said remote device via Short Message Service (SMS).

52. The method as recited in claim 51 wherein said method employs a Signaling System 7 (SS7) protocol.

53. The method as recited in claim 51 further comprising directing said telecommunications central office switch to establish a voice communication path between said remote device and another remote device, said maintaining allowing said reuse after said another remote device disconnects.

54. The method as recited in claim 51 wherein said maintaining allows said reuse by an action selected from the group consisting of:
   a voice command,
   a keyed command,
   an automated response, and
   a coded response.

55. The method as recited in claim 51 wherein said directing permits caller identification of said remote device with another remote device.

56. The method as recited in claim 51 wherein said method is performed by a system access module proximate said telecommunications central office switch.

57. The method as recited in claim 51 further comprising broadcasting a recorded message to a plurality of remote devices.

58. The method as recited in claim 51 further comprising providing a billing record associated with said voice communication path.

59. A telephony server system associated with a telecommunications central office switch, comprising:
   a voice integrated platform that has a voice activated front end; and
   a system access module, including:
      a call coordinator, coupled to said voice integrated platform and said telecommunications central office switch, that establishes, and later releases, a voice command link between said voice integrated platform and a remote device to utilize said voice integrated platform to direct said telecommunications central office switch to establish a voice communication path associated with said remote device;
      a call manager, coupled to said call coordinator, that allows reuse of at least a portion of said voice communication path as directed by said remote device; and
      an enhanced service subsystem that delivers at least a portion of call parameters of said voice communication path to said remote device via Short Message Service (SMS).

60. The telephony server system as recited in claim 59 wherein said call coordinator employs a Signaling System 7 (SS7) protocol.

61. The telephony server system as recited in claim 59 wherein at least a portion of said system access module is embodied within one of said voice integrated platform and a dedicated system.

62. The telephony server system as recited in claim 59 wherein said call coordinator directs said telecommunications central office switch to establish a voice communication path between said remote device and another remote device, said call coordinator activating said reuse after said another device disconnects.

63. The telephony server system as recited in claim 59 wherein said enhanced service subsystem is further configured to activate said reuse by an action selected from the group consisting of:
   a voice commands,
   a keyed command,
   an automated response, and
   a coded response.

64. The telephony server system as recited in claim 59 wherein said call manager permits caller identification of said remote device with another remote device.

65. The telephony server system as recited in claim 59 wherein said voice command link employs a Voice Over Internet Protocol link.

66. The telephony server system as recited in claim 59 wherein said system access module is proximate said telecommunications central office switch.

67. The telephony server system as recited in claim 64 wherein said system access module and said telecommunication central office switch are powered by a like source.

68. The telephony server system as recited in claim 59 wherein said system access module employs an alarm system of said telecommunication central office switch.

69. The telephony server system as recited in claim 59 wherein said enhanced service subsystem is further configured to provide a conference bridge for said remote device.

70. The telephony server system as recited in claim 59 wherein said enhanced service subsystem is further configured to broadcast a recorded message to a plurality of remote devices.

71. The telephony server system as recited in claim 59 wherein said system access module employs an operator service provider (OSP).

72. The telephony server system as recited in claim 59 wherein said system access module provides a billing record associated with said voice communication path.

73. A system access module for use with a unified messaging system having a voice activated front end and associated with a telecommunications central office switch, comprising:
   a call coordinator, coupled to said unified messaging system and said telecommunications central office switch, configured to establish, and later release, a voice command link between said unified messaging system and a remote device, said call coordinator configured to direct said telecommunications central office switch to establish a voice communication path associated with said remote device employing said unified messaging system; and
   a call manager, coupled to said call coordinator, that allows reuse of at least a portion of said voice communication path as directed by said remote device, and
   an enhanced service subsystem configured to deliver at least a portion of call parameters or said voice communication path to said remote device via Short Message Service (SMS).

74. The system access module as recited in claim 73 wherein said call coordinator employs a Signaling System 7 (SS7) protocol.

75. The system access module as recited in claim 73 wherein said call coordinator is configured to direct said telecommunications central office switch to establish a voice communication path between said remote device and another remote device, said call coordinator being configured to activate said reuse after said another remote device disconnects.

76. The system access module as recited in claim 73 further comprising an enhanced service subsystem configured to activate said reuse by an action selected from the group consisting of:
   a voice command,
   a keyed command,
   an automated response, and
   a coded response.

77. The system access module as recited in claim 73 wherein said call manager is configured to permit caller identification of said remote device with another remote device.

78. The system access module as recited in claim 73 wherein said system access module is proximate said telecommunications central office switch.

79. The system access module as recited in claim 73 further comprising an enhanced service subsystem configured to broadcast a recorded message to a plurality of remote devices.

80. The system access module as recited in claim 73 wherein said system access module is configured to provide a billing record associated with said voice communication path.

81. A system access module for use with an email reader system having a voice activated front end and associated with a telecommunications central office switch, comprising:

a call coordinator, coupled to said email reader system and said telecommunications central office switch, configured to establish, and later release, a voice command link between said email reader system and a remote device, said call coordinator configured to direct said telecommunications central office switch to establish a voice communication path associated with said remote device employing said email reader system;

a call manager, coupled to said call coordinator, that allows reuse of at least a portion of said voice communication path as directed by said remote device, and an enhanced service subsystem configured to deliver at least a portion of call parameters of said voice communication path to said remote device via Short Message Service (SMS).

82. The system access module as recited in claim 81 wherein said call coordinator is employs a Signaling System 7 (SS7) protocol.

83. The system access module as recited in claim 81 wherein said call coordinator is configured to direct said telecommunications central office switch to establish a voice communication path between said remote device and another remote device, said call coordinator being configured to activate said reuse after said another remote device, disconnects.

84. The system access module as recited in claim 81 further comprising an enhanced service subsystem configured to activate said reuse by an action selected from the group consisting of:

a voice command, a keyed command, an automated response, and a coded response.

85. The system access module as recited in claim 81 wherein said call manager is configured to permit caller identification of said remote device with another remote device.

86. The system access module as recited in claim 81 wherein said system access module is proximate said telecommunications central office switch.

87. The system access module as recited in claim 81 further comprising an enhanced service subsystem configured to broadcast a recorded message to a plurality of remote device.

88. The system access module as recited in claim 81 wherein said system access module is configured to provide a billing record associated with said voice communication path.

89. A system access module for use with a content provider having a voice activated front end and associated with a telecommunications central office switch, comprising:

a call coordinator, coupled to said content provider and said telecommunications central office switch, configured to establish, and later release, a voice command link between said content provider and a remote device, said call coordinator configured to direct said telecommunications central office switch to establish a voice communication path associated with said remote device employing said content provider;

a call manager, coupled to said call coordinator, that allows reuse of at least a portion of said voice communication path as directed by said remote device, and an enhanced service subsystem configured to deliver at least a portion of call parameters of said voice communication path to said remote device via Short Message Service (SMS).

90. The system access module as recited in claim 89 wherein said call coordinator employs a Signaling System 7 (SS7) protocol.

91. The system access module as recited in claim 89 wherein said call coordinator is configured to direct said telecommunications central office switch to establish a voice communication path between said remote device and another remote device, said call coordinator being configured to activate said reuse after said another remote disconnects.

92. The system access module as recited in claim 89 further comprising an enhanced service subsystem configured to activate said reuse by an action selected from the group consisting of:

a voice command, a keyed command, an automated response, and coded response.

93. The system access module as recited in claim 89 wherein said call manager is configured to permit caller identification of said remote device with another remote device.

94. The system access module as recited in claim 89 wherein said system access module is proximate said telecommunications central office switch.

95. The system access module as recited in claim 89 further comprising an enhanced service subsystem configured to broadcast a recorded message to a plurality of remote devices.

96. The system access module as recited in claim 89 wherein said system access module is configured to provide a billing record associated with said voice communication path.

97. A method of enabling a communication session by employing a unified messaging system having a voice activated front-end and a telecommunications central office switch, comprising:

establishing a voice command link between said unified messaging system and a remote device;

directing said telecommunications central office switch to establish a voice communication path associated with said remote device employing said unified messaging system;

releasing said voice command link;

maintaining at least a portion of said voice communication path to allow reuse as directed by said remote device, and delivering at least a portion of call parameters of said voice communication path to said remote device via Short Message Service (SMS).

98. The method as recited in claim 97 wherein said method employs a Signaling System 7 (SS7) protocol.

99. The method as recited in claim 97 further comprising directing said telecommunications central office switch to establish a voice communication path between said remote device and another remote device, said maintaining allowing said reuse after said another remote device disconnects.

100. The method as recited in claim 97 wherein said maintaining allows said reuse by an action selected from the group consisting of:
- a voice command,
- a keyed command,
- an automated response, and
- a coded response.

101. The method as recited in claim 97 wherein said directing permits caller identification of said remote device with another remote device.

102. The method as recited in claim 97 wherein said method is performed by a system access module proximate said telecommunications central office switch.

103. The method as recited in claim 97 further comprising broadcasting a recorded message to a plurality of remote devices.

104. The method as recited in claim 97 further comprising providing a billing record associated with said voice communication path.

105. A method of enabling a communication session by employing an email reader device having a voice activated front-end and a telecommunications central office switch, comprising:
- establishing a voice command link between said email reader device and a remote device;
- directing said telecommunications central office switch to establish a voice communication path associated with said remote device employing said email reader device;
- releasing said voice command link;
- maintaining at least a portion of said voice communication path to allow reuse as directed by said remote device, and
- delivering at least a portion of call parameters of said voice communication path to said remote device via Short Message Service (SMS).

106. The method as recited in claim 105 wherein said method employs a Signaling System 7 (SS7) protocol.

107. The method as recited in claim 105 further comprising directing said telecommunications central office switch to establish a voice communication path between said remote device and another remote device, said maintaining allowing said reuse after said another remote device disconnects.

108. The method as recited in claim 105 wherein said maintaining allows said reuse by an action selected from the group consisting of:
- a voice command,
- a keyed command,
- an automated response, and
- a coded response.

109. The method as recited in claim 105 wherein said directing permits caller identification of said remote device with another remote device.

110. The method as recited in claim 105 wherein said method is performed by a system access module proximate said telecommunications central office switch.

111. The method as recited in claim 105 further comprising broadcasting a recorded message to a plurality of remote devices.

112. The method as recited in claim 105 further comprising providing a billing record associated with said voice communication path.

113. A method of enabling a communication session by employing a content provider having a voice activated front-end and a telecommunications central office switch, comprising:
- establishing a voice command link between said content provider and a remote device;
- directing said telecommunications central office switch to establish a voice communication path associated with said remote device employing said content provider;
- releasing said voice command link;
- maintaining at least a portion of said voice communication path to allow reuse as directed by said remote device, and
- delivering at least a portion of call parameters of said voice communication path to said remote device via Short Message Service (SMS).

114. The method as recited in claim 113 wherein said method employs a Signaling System 7 (SS7) protocol.

115. The method as recited in claim 113 further comprising directing said telecommunications central office switch to establish a voice communication path between said remote device and another remote device, said maintaining allowing said reuse after said another remote device disconnects.

116. The method as recited in claim 113 wherein said maintaining allows said reuse by an action selected from the group consisting of:
- a voice command,
- a keyed command,
- an automated response, and
- a coded response.

117. The method as recited in claim 113 wherein said directing permits caller identification of said remote device with another remote device.

118. The method as recited in claim 113 wherein said method is performed by a system access module proximate said telecommunications central office switch.

119. The method as recited in claim 113 further comprising broadcasting a recorded message to a plurality of remote devices.

120. The method as recited in claim 113 further comprising providing a billing record associated with said voice communication path.

* * * * *

UNITED STATES PATENT AND TRADEMARK OFFICE
CERTIFICATE OF CORRECTION

| | |
|---|---|
| PATENT NO. | : 6,947,527 B2 |
| APPLICATION NO. | : 10/142163 |
| DATED | : September 20, 2005 |
| INVENTOR(S) | : Bobby R. Clark, Jr. et al. |

It is certified that error appears in the above-identified patent and that said Letters Patent is hereby corrected as shown below:

Column 6, line 63 through column 7, line 2 should appear as follows:

The SS7 link 250 is a standard SS7 A-link that is presently used in a majority of telecommunications networks. Similarly, the STP 255 may be a standard STP. The network 252 may include more than one STP 255 in mated pairs to provide redundancy. One skilled in the art will understand that the SS7 link 250 may be a conventional [[SS 7]] SS7 F-link instead of an A-link.

The above correction is fully supported in Column 7, line 1.

Claim 13 should appear as follows:

13. The system access module as recited in claim 1 wherein said system access module is configured to employ an operator service provider [[(QSP)]] (OSP).

The correction to claim 13 is fully supported in Column 21, line 67.

Claim 51 should appear as follows:

51. A method of enabling a communication session by employing a prepaid calling system having a voice activated front-end and a telecommunications central office switch, comprising:

establishing a voice command link between said prepaid calling system and a remote device;

directing said telecommunications central office switch to establish a voice communication path associated with said remote device employing said prepaid calling system;

releasing said voice command link;

maintaining at least a portion of said voice communication path to allow reuse as directed by said remote device, and

UNITED STATES PATENT AND TRADEMARK OFFICE
CERTIFICATE OF CORRECTION

| | | |
|---|---|---|
| PATENT NO. | : 6,947,527 B2 | Page 2 of 3 |
| APPLICATION NO. | : 10/142163 | |
| DATED | : September 20, 2005 | |
| INVENTOR(S) | : Bobby R. Clark, Jr. et al. | |

It is certified that error appears in the above-identified patent and that said Letters Patent is hereby corrected as shown below:

delivering at least a portion of call parameters of said voice communication path to said remote device via Short Message Service (SMS).

The correction to claim 51 is fully supported in Column 24, line 60.

Claim 59 should appear as follows:

59. A telephony server system associated with a telecommunications central office switch, comprising:

a voice integrated platform that has a voice activated front end; and a system access module, including[[;]] :

a call coordinator, coupled to said voice integrated platform and said telecommunications central office switch, that establishes, and later releases, a voice command link between said voice integrated platform and a remote device to utilize said voice integrated platform to direct said telecommunications central office switch to establish a voice communication path associated with said remote device;

a call manager, coupled to said call coordinator, that allows reuse of at least a portion of said voice communication path as directed by said remote device; and enhanced service subsystem that delivers at least a portion of call parameters of said voice communication path to said remote device via Short Message Service (SMS).

The corrections to claim 59 is fully supported in Column 25, lines 23 and 26.

Claim 62 should appear as follows:

62. The telephony server as recited in Claim 59 wherein said call coordinator directs said telecommunications central office switch to establish a voice communication path between said remote device and another remote device, said call coordinator activating said reuse after said another remote device disconnects.

The correction to claim 62 is fully supported in Column 25, line 55.

UNITED STATES PATENT AND TRADEMARK OFFICE
CERTIFICATE OF CORRECTION

PATENT NO. : 6,947,527 B2
APPLICATION NO. : 10/142163
DATED : September 20, 2005
INVENTOR(S) : Bobby R. Clark, Jr. et al.

It is certified that error appears in the above-identified patent and that said Letters Patent is hereby corrected as shown below:

Claim 91 should appear as follows:

91. The system access module as recited in Claim 89 wherein said call coordinator is configured to direct said telecommunications central office switch to establish a voice communication path between said remote device and another remote device, said call coordinator being configured to activate said reuse after said another remote <u>device</u> disconnects.

The correction to claim 91 is fully supported in Column 28, line 24.

Signed and Sealed this

Twenty-fifth Day of July, 2006

JON W. DUDAS
*Director of the United States Patent and Trademark Office*